(12) United States Patent
Griffin

(10) Patent No.: US 8,696,418 B1
(45) Date of Patent: Apr. 15, 2014

(54) SYSTEM AND METHOD FOR SECURING A PANEL SUCH AS AN AIRCRAFT AIR GRILLE

(75) Inventor: James A. Griffin, Broken Arrow, OK (US)

(73) Assignee: American Airlines, Inc., Fort Worth, TX (US)

( * ) Notice: Subject to any disclaimer, the term of this patent is extended or adjusted under 35 U.S.C. 154(b) by 1694 days.

(21) Appl. No.: 12/146,253

(22) Filed: Jun. 25, 2008

Related U.S. Application Data

(60) Provisional application No. 60/947,732, filed on Jul. 3, 2007.

(51) Int. Cl.
*B64D 13/00* (2006.01)

(52) U.S. Cl.
USPC .......................................................... 454/76

(58) Field of Classification Search
USPC ............................ 454/76, 69, 124, 72, 73, 74
See application file for complete search history.

(56) References Cited

U.S. PATENT DOCUMENTS

| | | | | |
|---|---|---|---|---|
| 1,979,543 A | * | 11/1934 | Heasley | 454/331 |
| 4,430,035 A | * | 2/1984 | Rodseth | 411/402 |
| 5,401,133 A | * | 3/1995 | Kuchler | 411/402 |
| 6,129,312 A | * | 10/2000 | Weber | 244/118.5 |
| 6,192,640 B1 | * | 2/2001 | Snyder | 52/302.1 |
| 6,935,824 B2 | * | 8/2005 | Nowak, Jr. | 411/402 |
| 7,162,939 B2 | * | 1/2007 | Totsu | 81/460 |
| 7,425,112 B2 | * | 9/2008 | Nowak, Jr. | 411/402 |
| 2008/0290217 A1 | * | 11/2008 | Ghoreishi et al. | 244/129.4 |

OTHER PUBLICATIONS

U.S. Appl. No. 60/947,732, filed Jul. 3, 2007, Griffin, James A.

* cited by examiner

*Primary Examiner* — Steven B McAllister
*Assistant Examiner* — Brittany Towns
(74) *Attorney, Agent, or Firm* — Haynes and Boone, LLP

(57) ABSTRACT

A system for securing a panel is described. In an exemplary embodiment, the panel is an air grille, such as, for example, an aircraft air-return air grille.

9 Claims, 18 Drawing Sheets

*Fig. 2*

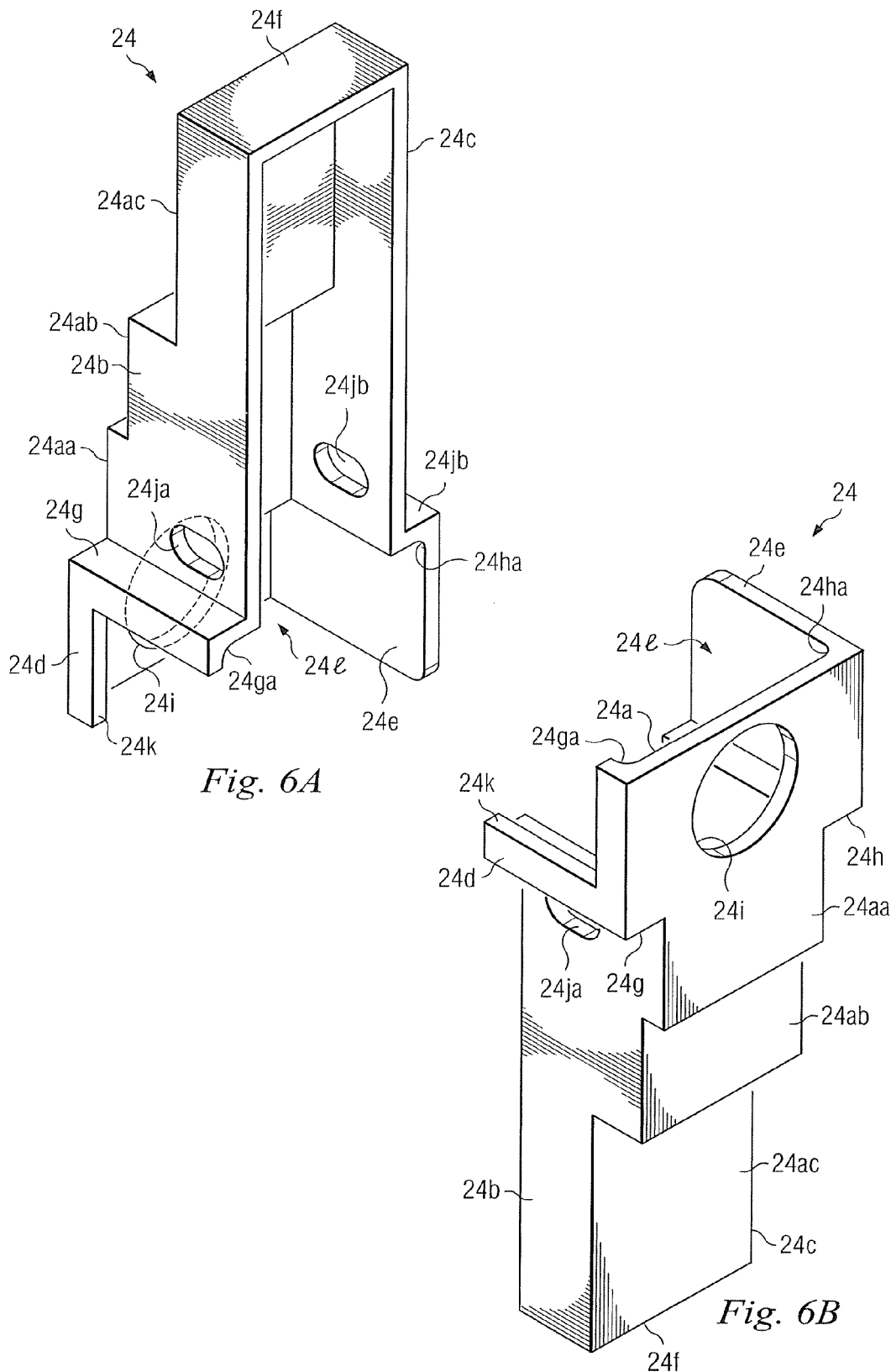

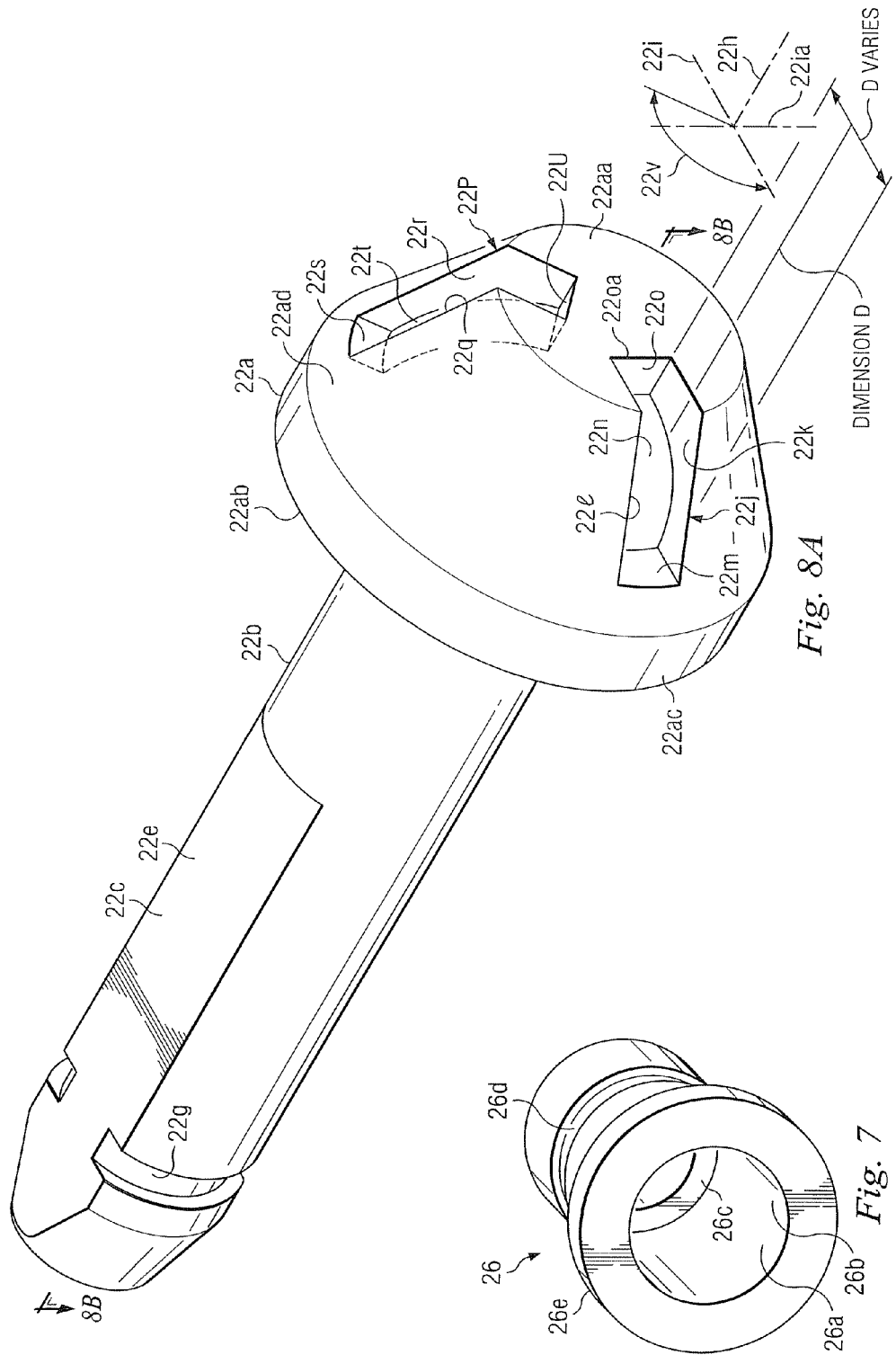

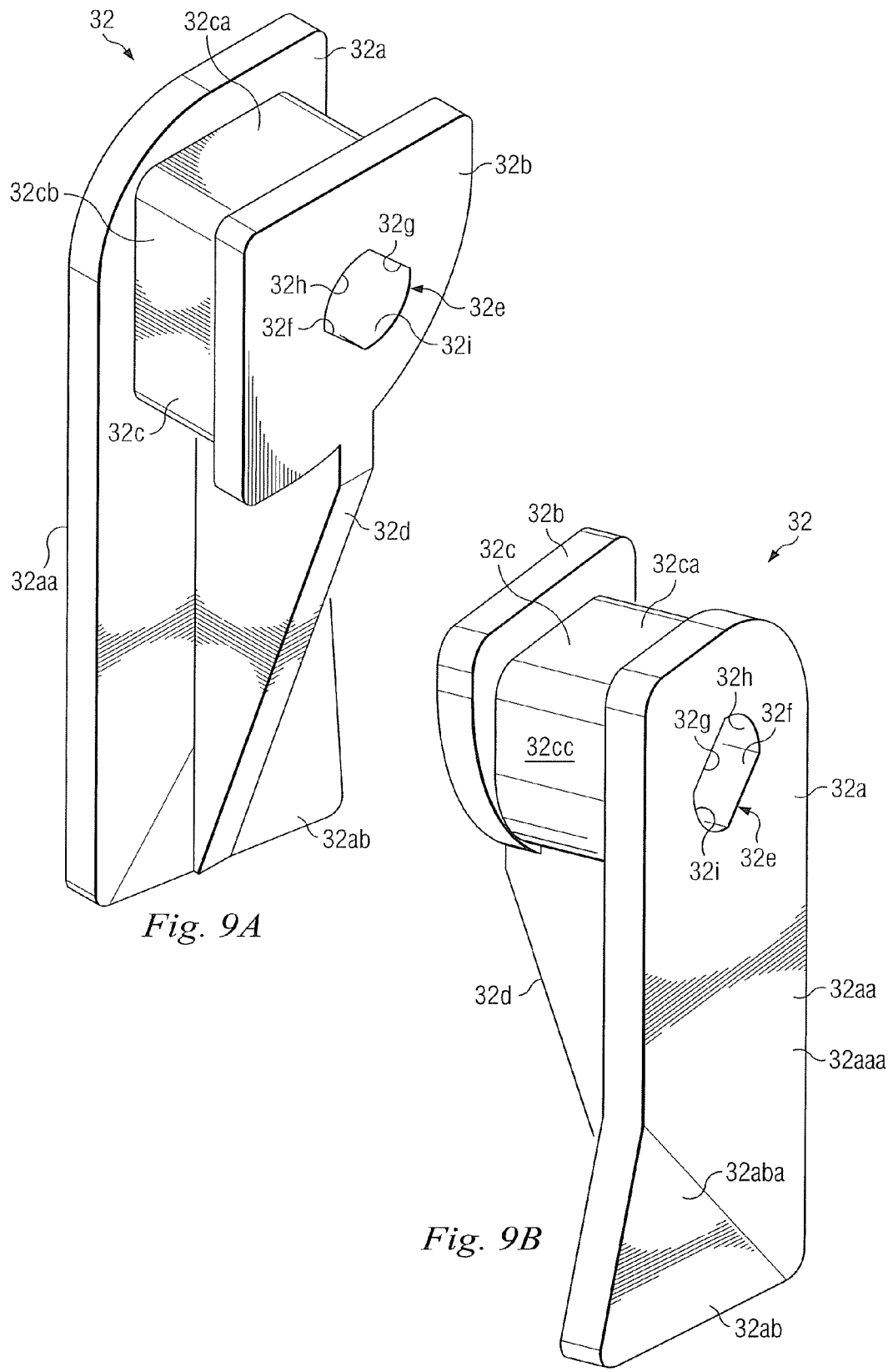

SYSTEM AND METHOD FOR SECURING A PANEL SUCH AS AN AIRCRAFT AIR GRILLE

CROSS REFERENCE TO RELATED APPLICATION

This application claims the benefit of the filing date of U.S. application No. 60/947,732, filed on Jul. 3, 2007, the disclosure of which is incorporated herein by reference.

BACKGROUND

The present disclosure relates in general to panels, and in particular to a system and method for securing a panel, such as, for example, an air grille for use on an aircraft.

BRIEF DESCRIPTION OF THE DRAWINGS

FIGS. 6A and 6B are perspective views of the adapter of FIGS. 3A, 3B, 4 and 5, according to an exemplary embodiment.

FIG. 7 is a perspective view of the cup of FIGS. 3A, 3B, 4 and 5, according to an exemplary embodiment.

FIG. 8A is a perspective view of the fastener of FIGS. 3A, 3B, 4 and 5, according to an exemplary embodiment.

FIGS. 9A and 9B are perspective views of the pawl of FIGS. 3A, 3B, 4 and 5, according to an exemplary embodiment.

DETAILED DESCRIPTION

Figure 1:
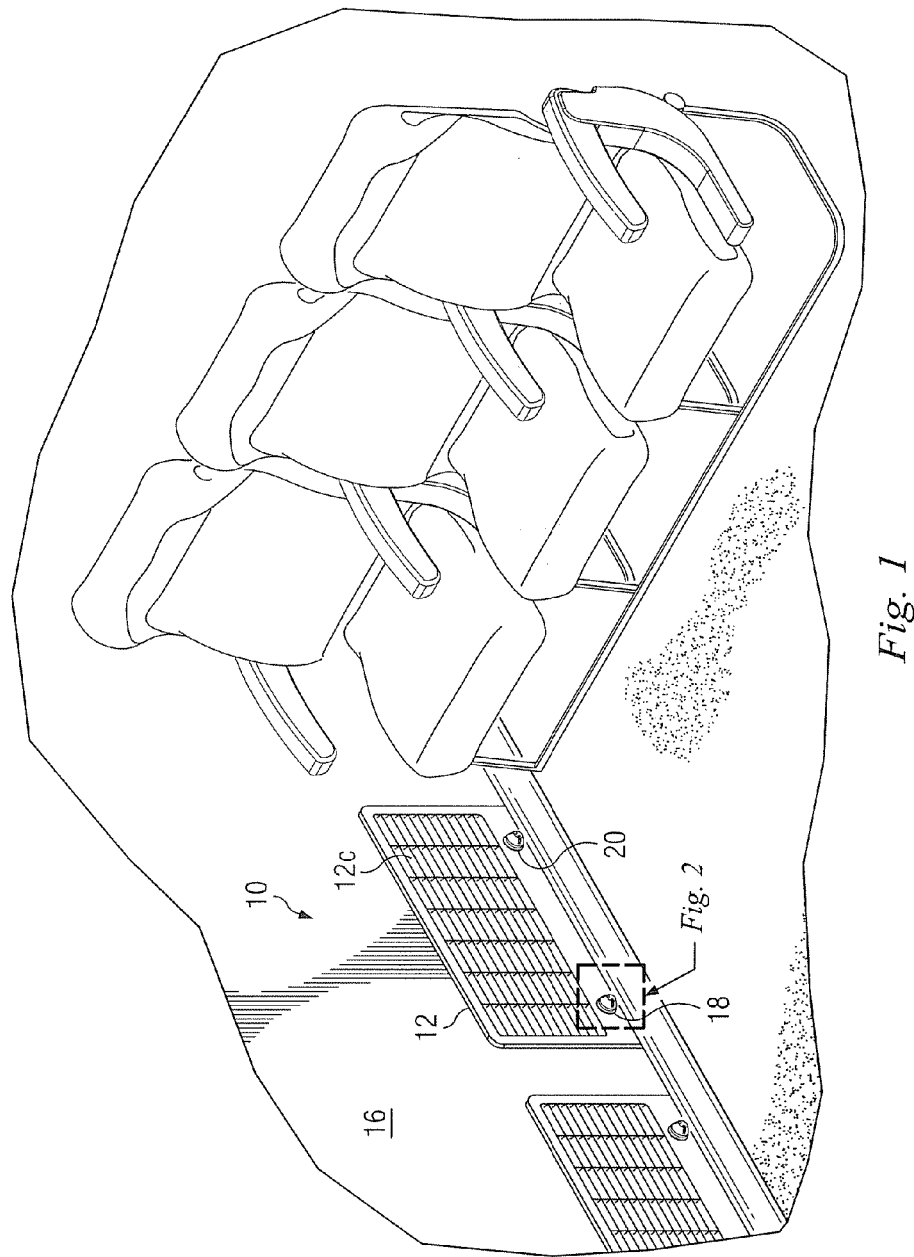
FIG. 1 is a perspective view of a system according to an exemplary embodiment, the system including an air grille, a trim strip, aircraft structure, and securing assemblies, according to respective exemplary embodiments.

In an exemplary embodiment, as illustrated in FIG. 1, a system is generally referred to by the reference numeral 10 and includes an air grille 12, the lower portion of which is proximate or contacting a floor molding or trim strip 14. The air grille 12 is engaged with aircraft structure 16, and securing assemblies 18 and 20 are coupled to the air grille 12. The assemblies 18 and 20 secure the air grille 12 to the aircraft structure 16. In an exemplary embodiment, the air grille 12 is an aircraft air-return grille. In an exemplary embodiment, the aircraft structure 16, the air grille 12, and the assemblies 18 and 20 are part of a Boeing® 737, 757 or 767 aircraft. In several exemplary embodiments, instead of a Boeing® 737, 757 or 767 aircraft, the aircraft structure 16, the air grille 12, and the assemblies 18 and 20 are part of one or more other types of aircraft.

In an exemplary embodiment, as illustrated in FIGS. 1, 2, 3A, 3B, 4 and 5, the assembly 18 includes a fastener 22, an adapter 24, a flat spring 25, a cup 26, a helical spring 28, a split ring 30, a pawl 32, a retaining washer 34, a pin 36, retaining washers 38a and 38b, and a damper element 40. Under conditions to be described below, the assembly 18 is adapted to move between two operational positions, namely an open position shown in FIGS. 3A and 3B, and a closed position shown in FIG. 4.

Figure 11B:
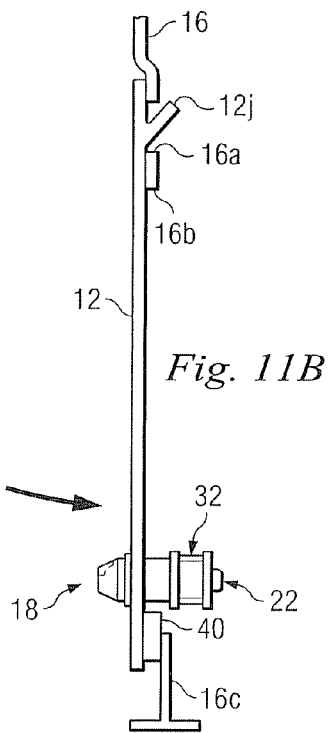
FIGS. 11A, 11B and 11C are simplified sectional views depicting the securement of the air grille of FIG. 1 to the aircraft structure of FIG. 1, according to an exemplary embodiment.
Figure 11A:
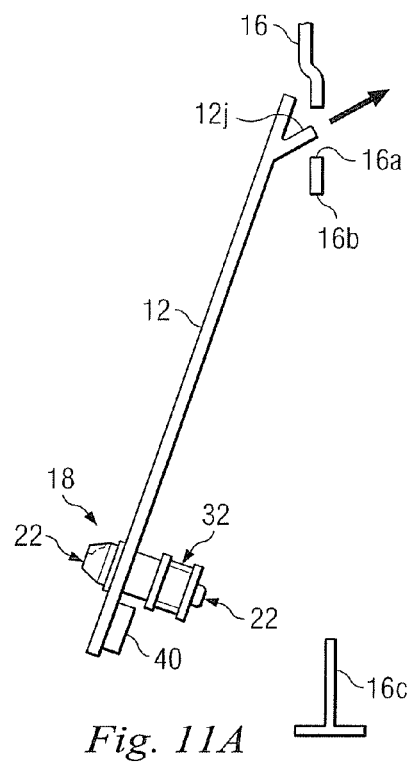
Figure 11C:
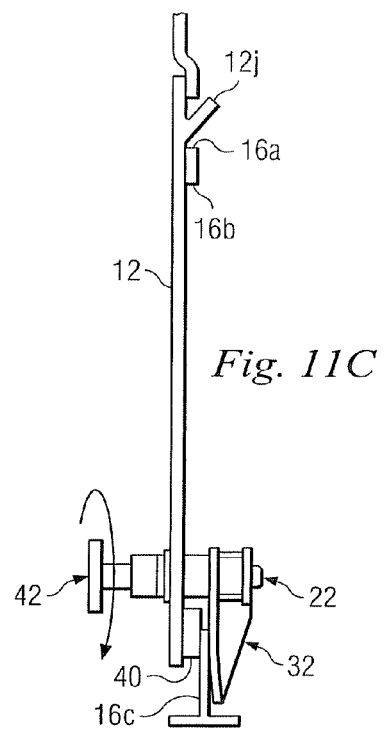

The air grille 12 defines sides 12a and 12b, and includes a plurality of slots and/or angled louvers 12c, a bore 12d formed through the air grille 12 below the louvers 12c, and a pair of walls 12ea and 12eb extending from the side 12b and partially defining a region 12f. Walls 12ga and 12gb extend from the side 12b and are spaced in a parallel relation from the walls 12ea and 12eb, respectively, so that the walls 12ea and 12eb are positioned between the walls 12ga and 12gb. A discontinuous bore 12h extends through the respective lower end portions of the walls 12ga, 12ea, 12eb and 12gb. A rectangular region 12i is defined in the side 12b. A pair of tabs 12j (one of the tabs 12j is shown in FIGS. 11A, 11B and 11C) extend generally angularly upward from the upper portion of the side 12b.

Figure 4:
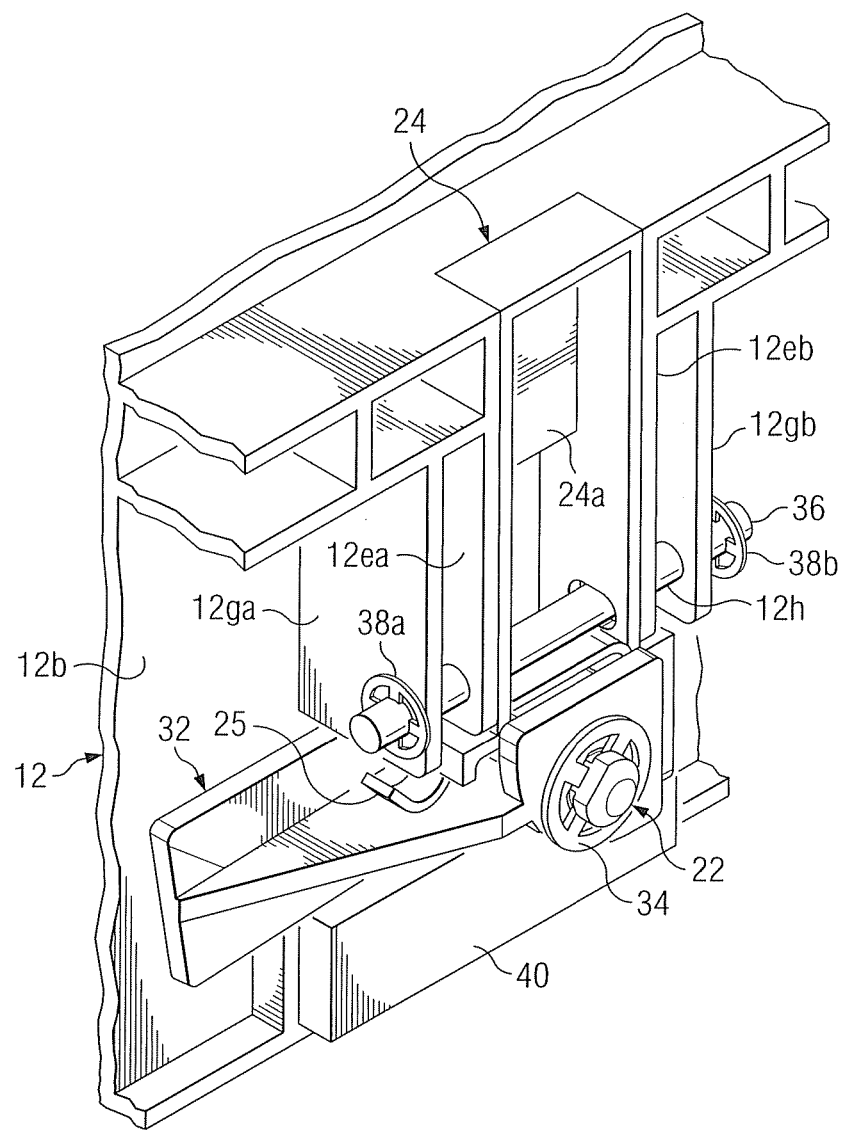
FIG. 4 is a view similar to that of FIG. 3A but depicting the securing assembly in another operational position, according to an exemplary embodiment.
Figure 5:
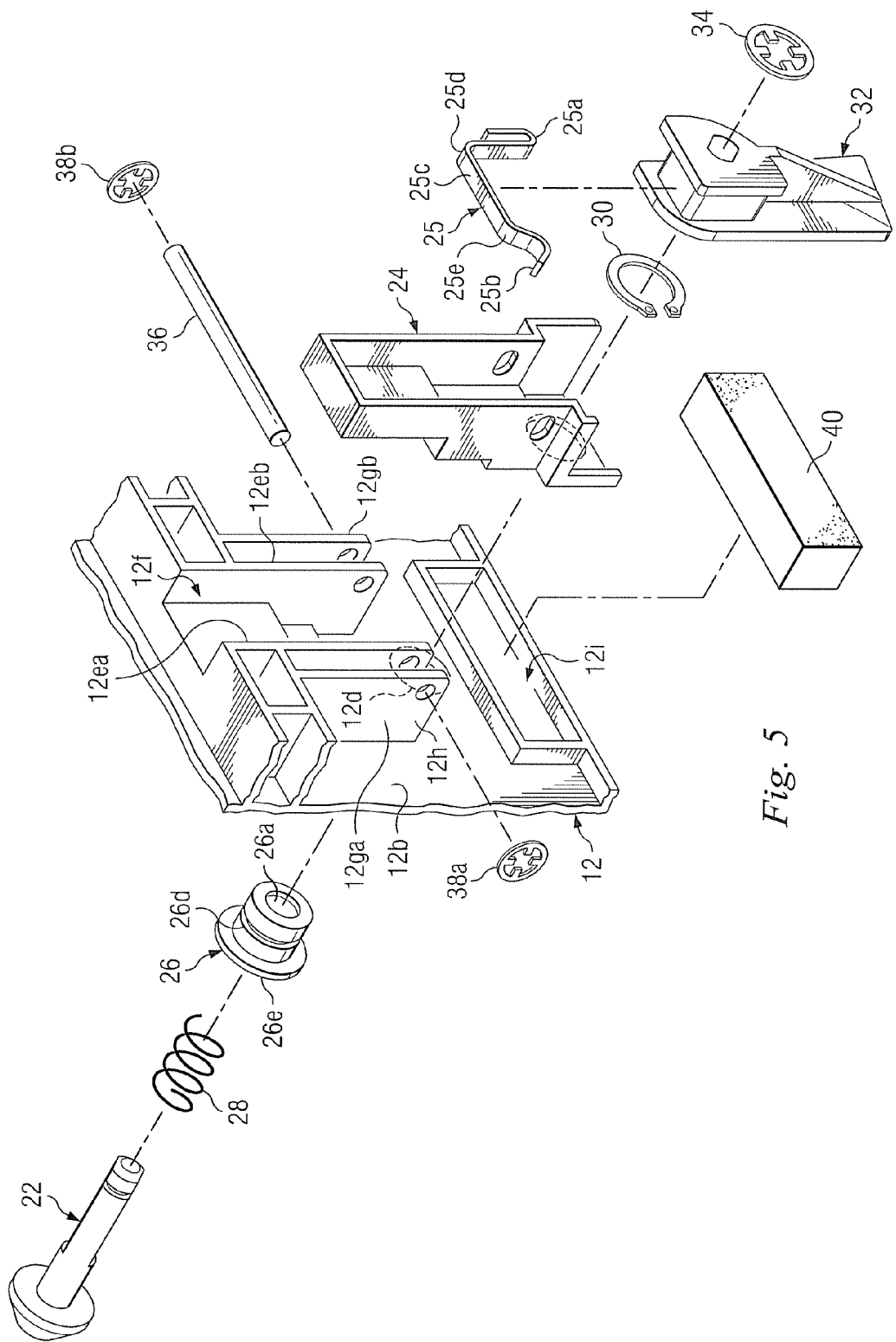
FIG. 5 is an exploded view of the air grille and securing assembly of FIGS. 2, 3A, 3B and 4.

In an exemplary embodiment, as illustrated in FIG. 5 with continuing reference to FIGS. 1, 2, 3A, 3B and 4, the flat spring 25 includes a J-hook-shaped portion 25a, a hook-shaped portion 25b, and a horizontal portion 25c extending therebetween. Rounds 25d and 25e extend between the horizontal portion 25c and the hook-shaped portions 25a and 25b, respectively.

In an exemplary embodiment, as illustrated in FIGS. 6A and 6B with continuing reference to FIGS. 1, 2, 3A, 3B, 4 and 5, the adapter 24 includes a stepped wall 24a, which includes step portions 24aa, 24ab and 24ac. The step portions 24aa, 24ab and 24ac are offset from one another and otherwise configured to contact, and/or at least accommodate, the surface contour defined by the side 12b and located between the walls 12ea and 12eb of the air grille 12. Parallel-spaced walls 24b and 24c, and parallel-spaced walls 24d and 24e, extend from the stepped wall 24a. An end wall 24f extends from the stepped wall 24a and transversely between the walls 24b and 24c. A transition wall 24g including a fillet 24ga extends from the wall 24a and transversely between the walls 24b and 24d. Likewise, a transition wall 24h including a fillet 24ha extends from the wall 24a and transversely between the walls 24c and 24e. A bore 24i extends through the step portion 24aa and between the walls 24d and 24e. Axially-aligned slots 24ja and 24jb extend through the respective end portions of the walls 24b and 24c opposing the end wall 24f. A notch 24k is formed in the wall 24d. A region 24l is defined by the walls 24d and 24e, and the stepped portion 24aa of the wall 24a.

In an exemplary embodiment, as illustrated in FIG. 7 with continuing reference to FIGS. 1, 2, 3A, 3B, 4, 5, 6A and 6B, the cup 26 includes a counterbore 26a, which defines an enlarged-diameter region 26b and an internal shoulder 26c, an external annular recess 26d, and an external annular lip 26e.

Figure 8B:
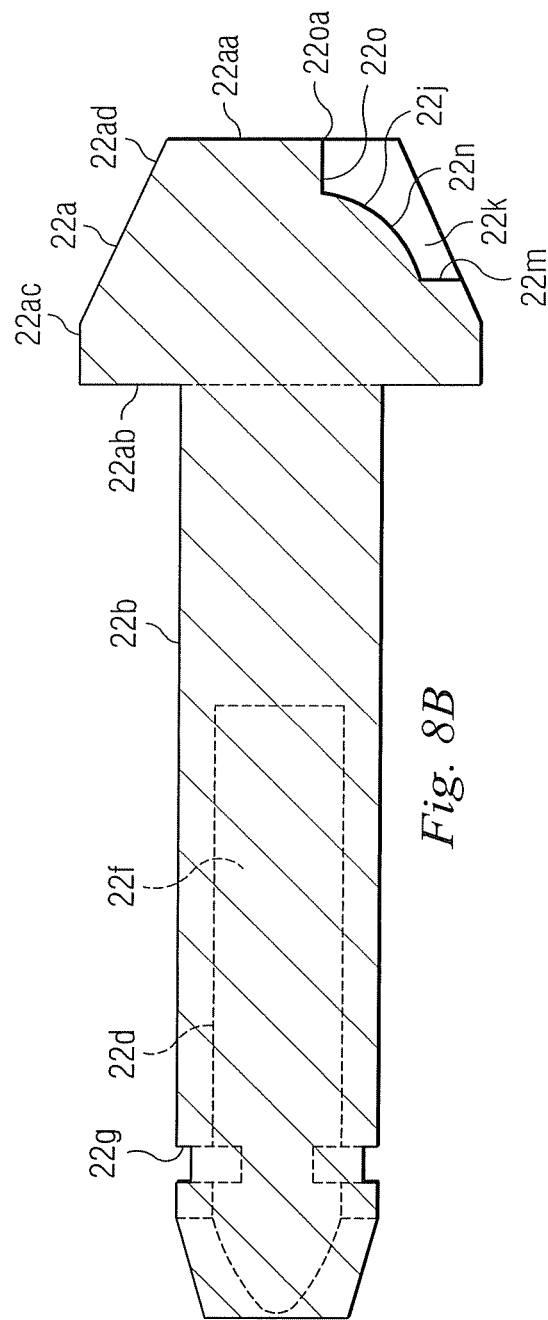
FIG. 8B is a sectional view of the fastener of FIG. 8A taken along line 8B-8B.

In an exemplary embodiment, as illustrated in FIGS. 8A and 8B with continuing reference to FIGS. 1, 2, 3A, 3B, 4, 5, 6A, 6B and 7, the fastener 22 includes a tamper-resistant head 22a and a shank 22b extending therefrom. The head 22a defines a top side 22aa, a bottom side 22ab spaced in a parallel relation to the top side 22aa and defining a circumferentially-extending outer surface 22ac, and a frusto-conical surface 22ad extending upwardly from the outer surface 22ac and tapering to the top side 22aa. Flats 22c and 22d are formed in the shank 22b and extend longitudinally from the distal end portion of the shank 22b to a point between the head 22a and the distal end portion of the shank 22b. The flats 22c and 22d define surfaces 22e and 22f, respectively, which surfaces are spaced in a parallel relation. An external annular recess 22g is formed in the distal end portion of the shank 22b. As a result of the flats 22c and 22d, the external annular recess 22g is discontinuous. The fastener 22 includes a longitudinal center axis 22h. An axis 22i is perpendicular to the longitudinal center axis 22h. An axis 22ia is perpendicular to each of the axes 22h and 22i.

A slot 22j is formed in the head 22a. The slot 22j defines parallel-spaced surfaces 22k and 22l, a flat surface 22m, a semi-spherical or convex surface 22n, and a flat surface 22o. The flat surface 22m is relatively proximate the bottom side 22ab of the head 22a, and defines a plane that is perpendicular to the longitudinal center axis 22h and parallel to the axes 22i and 22ia. The flat surface 22o extends from the top of the head 22a and into the interior of the head 22a, and defines a plane that is parallel to the axes 22h and 22ia and perpendicular to the axis 22i. The flat surface 22o further defines an end 22oa of the slot 22j. The flat surface 22m is radially positioned between the outer surface 22ac and the flat surface 22o. The flat surfaces 22m and 22o are perpendicular to each other, and the convex surface 22n extends between the flat surfaces 22m and 22o.

As a result of the above-described design of the slot 22j, the depth of at least a portion of the slot 22j varies along a radial direction from the longitudinal axis 22h such as, for example, a radial direction corresponding to the direction of extension of the axis 22i from the axis 22h. More particularly, a depth dimension D, which refers to a depth dimension that is parallel to the longitudinal center axis 22h and that can be measured from any point along the longitudinal center axis 22h at or above the end 22oa of the slot 22j such as, for example, the position of the axis 22i along the axis 22h as shown in FIG. 8A, varies along a radial direction from the axis 22h such as, for example, the radial direction corresponding to the direction of extension of the axis 22i from the axis 22h. The dimension D varies along a radial direction from the longitudinal center axis 22h by increasing as the dimension D moves radially outwardly away from the longitudinal center axis 22h, and by decreasing as the dimension D moves radially inwardly towards the longitudinal center axis 22h.

A slot 22p is formed in the head 22a. The slot 22p defines parallel-spaced surfaces 22q and 22r, a flat surface 22s, a semi-spherical or convex surface 22t, and a flat surface 22u. The flat surface 22s is relatively proximate the bottom side 22ab of the head 22a, and defines a plane that is perpendicular to the longitudinal center axis 22h and parallel to the axes 22i and 22ia. The flat surface 22u extends from the top side 22aa of the head 22a and into the interior of the head 22a, and defines a plane that is parallel to the axes 22h and 22ia and perpendicular to the axis 22i. The flat surface 22s is radially positioned between the outer surface 22ac and the flat surface 22u. The flat surfaces 22s and 22u are perpendicular to each other, and the convex surface 22t extends between the flat surfaces 22s and 22u. As a result of the above-described design of the slot 22p, the depth of at least a portion of the slot 22p varies along a radial direction from the longitudinal center axis 22h, in a manner similar to the above-described manner by which the depth of at least a portion of the slot 22j varies along a radial direction from the longitudinal center axis 22h.

An angle 22v is defined between the slots 22j and 22p. The angle 22v corresponds to the angle between the respective directions of radial extension of the slots 22j and 22p from the longitudinal center axis 22h. In an exemplary embodiment, the angle 22v is 135 degrees. In an exemplary embodiment, the angle 22v is greater than 120 degrees and less than 180 degrees.

In an exemplary embodiment, as illustrated in FIGS. 9A and 9B with continuing reference to FIGS. 1, 2, 3A, 3B, 4, 5, 6A, 6B, 7, 8A and 8B, the pawl 32 includes a plate 32a having a portion 32aa and a corner portion 32ab extending therefrom. The portions 32aa and 32ab are angularly oriented with respect to each other, and define surfaces 32aaa and 32aba, respectively. The pawl 32 further includes a plate 32b and a block 32c extending between the plates 32a and 32b. The block 32c defines surfaces 32ca and 32cb, which are perpendicular to each other, and a surface 32cc, which is parallel to the surface 32cb. A web 32d extends from each of the portion 32aa of the plate 32a, the portion 32ab of the plate 32a, the plate 32b, and the block 32c. A slot 32e extends through the plate 32a, the block 32c, and the plate 32b, and defines surfaces 32f and 32g of the pawl 32, which are spaced in a parallel relation, and opposing curved surfaces 32h and 32i, each of which extends between the surfaces 32f and 32g.

In an exemplary embodiment, the assembly 20 is substantially identical to the assembly 18 and therefore the assembly 20 will not be described in further detail.

In an exemplary embodiment, with continuing reference to FIGS. 1, 2, 3A, 3B, 4, 5, 6A, 6B, 7, 8A, 8B, 9A and 9B, when the assembly 18 is in its assembled condition and coupled to the air grille 12 as shown in FIGS. 1, 2, 3A, 3B and 4, the stepped wall 24a of the adapter 24 is positioned against the side 12b of the air grille 12, contacting, and/or at least accommodating, the surface contour of the portion of the side 12b located between the walls 12ea and 12eb of the air grille 12. The walls 24b and 24c of the adapter 24 contact or are proximate the walls 12*ea* and 12*eb*, respectively, of the air grille 12, and the walls 24*d* and 24*e* of the adapter 24 extend below the walls 12*ea* and 12*eb*. The transition walls 24*g* and 24*h* of the adapter 24 contact or are proximate the lower ends of the walls 12*ea* and 12*eb*, respectively, of the air grille 12. The slots 24*ja* and 24*jb* of the adapter 24 are axially aligned with the discontinuous bore 12*h* of the air grille 12. The pin 36 extends through the axially-aligned bore 12*h* and slots 24*ja* and 24*jb*, thereby securing the adapter 24 to the air grille 12. The retaining washers 38*a* and 38*b* are coupled to opposing end portions of the pin 36, respectively, with the retaining washer 38*a* being positioned between the wall 12*ga* of the air grille 12 and one end of the pin 36, and the retaining washer 38*b* being positioned between the wall 12*gb* of the air grille 12 and the other end of the pin 36. As a result, the pin 36 is secured to the air grille 12. In an exemplary embodiment, the air grille 12 is an aircraft air-return grille for a Boeing® 737, 757 or 767 aircraft, and, as a result of the above-described coupling of the adapter 24 to the air grille 12, the adapter 24 is permitted to be integrated within the overall structure of the air grille 12, without appreciably altering the physical design of the air grille 12 including its overall volumetric envelope, thereby not affecting the engagement, and/or functional interaction, between the air grille 12 and the other parts of the aircraft including the structure 16.

The wall 24*e* of the adapter 24 extends downward and between the opposing walls of the J-hook-shaped portion 25*a* of the flat spring 25. In an exemplary embodiment, the wall 24*e* of the adapter 24 forces the opposing walls of the J-hook-shaped portion 25*a* apart no that the J-hook-shaped portion 25*a* clamps onto the wall 24*e*, thereby coupling the flat spring 25 to the air grille 12. The horizontal portion 25*c* of the flat spring 25 extends across the upper portion of the region 24*l* of the adapter 24, and is positioned immediately below the lower ends of the walls 24*b* and 24*c* of the adapter 24, so that the rounds 25*d* and 25*e* of the flat spring 25 contact the fillets 24*ga* and 24*ha*, respectively, of the adapter 24. The hook-shaped portion 25*b* of the flat spring 25 is disposed below the lower end of the wall 12*ga* of the air grille 12.

The cup 26 extends through the bore 12*d* of the air grille 12, and through the bore 24*i* of the adapter 24, so that the external annular lip 26*e* contacts the side 12*a* of the air grille 12. The split ring 30 extends within the external annular recess 26*d*. Since respective portions of the air grille 12 and the wall 24*a* are disposed between the external annular lip 26*e* and the split ring 30, the cup 26 is secured to the air grille 12 and the adapter 24 is further secured to the air grille 12. The helical spring 28 is disposed in the enlarged diameter region 26*b* defined by the counterbore 26*a* of the cup 26.

The pawl 32 extends within the region 24*l* of the adapter 24 so that the block 32*c* contacts or is proximate the horizontal portion 25*c* of the flat spring 25. The surface 32*aaa* contacts or is proximate the end of the cup 26 opposing the external annular lip 26*e*.

The shank 22*b* of the fastener 22 extends through the helical spring 28, the counterbore 26*a* of the cup 26, and the slot 32*e* of the pawl 32. The surfaces 22*e* and 22*f* defined by the flats 22*c* and 22*d*, respectively, of the fastener 22 contact or are proximate the surfaces 32*f* and 32*g*, respectively, of the pawl 32, or vice versa. The head 22*a* of the fastener 22 contacts or is proximate the helical spring 28 so that the helical spring 28 is trapped within the enlarged-diameter region 26*b* of the cup 26, between the internal shoulder 26*c* of the cup 26 and the head 22*a* of the fastener 22. The retaining washer 34 extends within the external annular recess 22*g* of the fastener 22. As a result, the fastener 22 and the pawl 32 are coupled together and secured to the air grille 12.

The dampener 40 extends within the rectangular region 12*i* defined in the side 12*b*. In an exemplary embodiment, the dampener 40 is trapped within the rectangular region 12*i* by one or more walls which define the rectangular region 12*i*. In an exemplary embodiment, instead of, or in addition to one or more walls defining the rectangular region 12*i* and trapping the dampener 40 to hold the dampener 40 in place, an adhesive is disposed between the dampener 40 and the side 12*b* of the air grille 12 to hold the dampener 40 in place. The dampener 40 is adapted to be disposed between the air grille 12 and the surfaces 32*aaa* and/or 32*aba* of the pawl 32, under conditions to be described.

In an exemplary embodiment, the assembled condition of the assembly 20, and the coupling of the assembly 20 to the air grille 12, are substantially identical to the assembled condition of the assembly 18 and its coupling to the air grille 12. Therefore, the assembled condition of the assembly 20 and its coupling to the air grille 12 will not be described in further detail.

Figure 10:
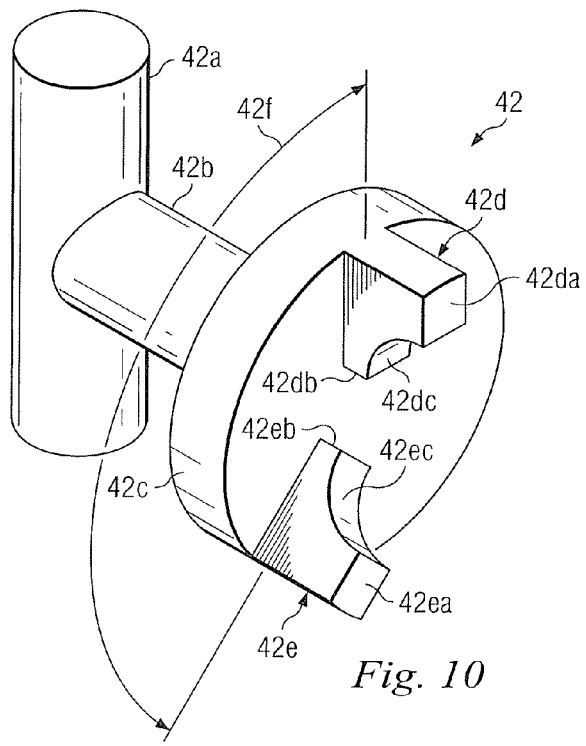
FIG. 10 is a perspective view of a tool adapted to engage the fastener of FIGS. 8A and 8B, according to an exemplary embodiment.

In an exemplary embodiment, as illustrated in FIG. 10 with continuing reference to FIGS. 1, 2, 3A, 3B, 4, 5, 6A, 6B, 7, 8A, 8B, 9A and 9B, a tool is generally referred to by the reference numeral 42 and is adapted for use with the assemblies 18 and 20, under conditions to be described below. The tool 42 includes a T-handle 42*a* and a shank 42*b* extending therefrom. A head 42*c* extends from the end of the shank 42*b* opposing the T-handle 42*a*. The head 42*c* includes projections 42*d* and 42*e*, which are adapted to extend within the slots 22*j* and 22*p* of the fastener 22, respectively, under conditions to be described. The projection 42*d* defines flat surfaces 42*da* and 42*db*, and a concave surface 42*dc* extending therebetween. The surfaces 42*da* and 42*db* are perpendicular to each other. The surfaces 42*da*, 42*dc* and 42*db* are configured to contact, and/or at least accommodate, the above-described multi-plane surface contour defined by the slot 22*j*, that is, the surfaces 22*m*, 22*n* and 22*o*, respectively. Likewise, the projection 42*e* defines flat surfaces 42*ea* and 42*eb*, and a concave surface 42*ec* extending therebetween. The surfaces 42*ea* and 42*eb* are perpendicular to each other. The surfaces 42*ea*, 42*ec* and 42*eb* are configured to contact, and/or at least accommodate, the above-described multi-plane surface contour defined by the slot 22*p*, that is, the surfaces 22*s*, 22*t* and 22*u*, respectively. An angle 42*f* is defined between the projections 42*d* and 42*e*. The angle 42*f* is equal to the angle 22*v* of the fastener 22. In an exemplary embodiment, the angle 42*f* is greater than 120 degrees and less than 180 degrees. In an exemplary embodiment, instead of the T-handle 42*a*, the tool 42 includes one or more other types of handles including, for example, a screwdriver handle.

In operation, in an exemplary embodiment, as illustrated in FIGS. 11A, 11B, 11C and 12 with continuing reference to FIGS. 1, 2, 3A, 3B, 4, 5, 6A, 6B, 7, 8A, 8B, 9A, 9B and 10, the assemblies 18 and 20 are coupled to the air grille 12, in accordance with the foregoing, and the air grille 12 is then secured to the aircraft structure 16.

In an exemplary embodiment, to secure the air grille 12 to the aircraft structure 16, if necessary, the assemblies 18 and 20 are placed in their respective open positions, which open position is shown in FIGS. 4 and 11A. More particularly, if necessary, the tool 42 is engaged with the head 22*a* of the fastener 22 so that the projections 42*d* and 42*e* extend within the slots 22*j* and 22*p*, respectively, of the fastener 22. The tool 42 is then rotated in place, in a counterclockwise direction as viewed in FIGS. 1, 2 and 12, thereby rotating the fastener 22 in a counterclockwise direction, as viewed in FIGS. 1, 2 and 12. As a result, the pawl 32 rotates in a counterclockwise direction, as viewed in FIGS. 1, 2 and 12, and the assembly 18 is placed in its open position. During the rotation of the pawl 32, the round extending between the surfaces 32ca and 32cb of the block 32c pushes up against the horizontal portion 25c of the flat spring 25, overcoming the downwardly-directed reaction or biasing force provided by the horizontal portion 25c. The biasing force provided by the horizontal portion 25c of the flat spring 25 provides a tactile response to the operator of the tool 42, indicating that the pawl 32 is indeed undergoing rotation, and further controls the rotation of the pawl 32 by not permitting the pawl 32 to rotate loosely or freely. After the pawl 32 has rotated approximately ninety degrees, the round extending between the surfaces 32ca and 32cb of the block 32c no longer pushes up against the horizontal portion 25c. As a result, the horizontal portion 25c snaps back, or a least returns, to its normal horizontally-extending position.

In an exemplary embodiment, after the pawl 32 has rotated approximately ninety degrees, any further rotation of the pawl 32 in a counterclockwise direction (as viewed in FIGS. 1, 2 and 12) is prevented or at least limited by one or more of the engagement between the web 32d of the pawl 32 and the hook-shaped portion 25b of the flat spring 25, the engagement between the web 32d and/or another portion of the pawl 32 and the downwardly-directed end face of the wall 24d of the adapter 24, and the engagement between plate 32a of the pawl 32 and the downwardly-directed end face of the 12ga of the air grille 12.

In an exemplary embodiment, after the horizontal portion 25c of the flat spring 25 has returned to its normal position, the horizontal portion 25c contacts, or is proximate, the surface 32cb of the pawl 32, thereby maintaining the open position of the assembly 18 by preventing the pawl 32 and thus the fastener 22 from rotating freely.

The assembly 20 is placed in its open position in a manner substantially identical to the above-described manner by which the assembly 18 is placed in its open position.

After the assemblies 18 and 20 have been placed in their open positions as illustrated in FIG. 11A, the pair of tabs 12j of the air grille 12 are inserted into a pair of slots 16a, respectively, formed in the aircraft structure 16 (one of the slots 16a is shown in FIGS. 11A, 11B and 11C). The slots 16a are positioned above an opening 16b formed in the aircraft structure 16, which opening 16b is to be covered by the air grille 12.

After the tabs 12j have been inserted in the slots 16a, respectively, the air grille 12 is rotated in a counterclockwise direction, as viewed in FIGS. 11A, 11B and 11C, and/or positioned, until the lower portion of the air grille 12 contacts or is proximate a vertically-extending portion 16c of the aircraft structure 16. In an exemplary embodiment, the air grille 12 is rotated and/or positioned until the damper element 40 contacts the portion 16c of the aircraft structure 16, thereby covering the opening 16b, as illustrated in FIG. 11B.

After the lower portion of the air grille 12 has contacted or is proximate the portion 16c of the aircraft structure 16, the assemblies 18 and 20 are placed in their respective closed positions, which closed position is shown in FIGS. 2, 3A, 3B, 11C and 12. More particularly, the tool 42 is engaged with the head 22a of the fastener 22 so that the projections 42d and 42e extend within the slots 22j and 22p, respectively, of the fastener 22. The tool 42 is then rotated in place, in a clockwise direction, as viewed in FIGS. 1, 2 and 12, thereby rotating the fastener 22 in a clockwise direction, as viewed in FIGS. 1, 2 and 12. As a result, the pawl 32 rotates in a clockwise direction, as viewed in FIGS. 1, 2 and 12. During the rotation of the pawl 32, the round extending between the surfaces 32ca and 32cb of the block 32c pushes up against the horizontal portion 25c of the flat spring 25, overcoming the downwardly-directed reaction or biasing force provided by the horizontal portion 25c. The biasing force provided by the horizontal portion 25c of the flat spring 25 provides a tactile response to the operator of the tool 42, indicating that the pawl 32 is indeed undergoing rotation, and further controls the rotation of the pawl 32 by not permitting the pawl 32 to rotate loosely or freely.

Figure 2:
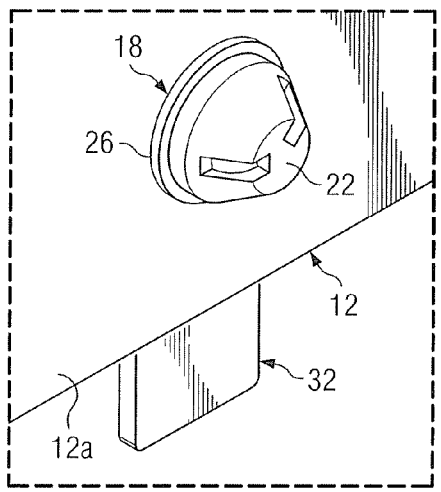
FIG. 2 is an enlarged view of a portion of the system of FIG. 1, depicting respective portions of the air grille and one of the securing assemblies, according to respective exemplary embodiments.
Figure 3A:
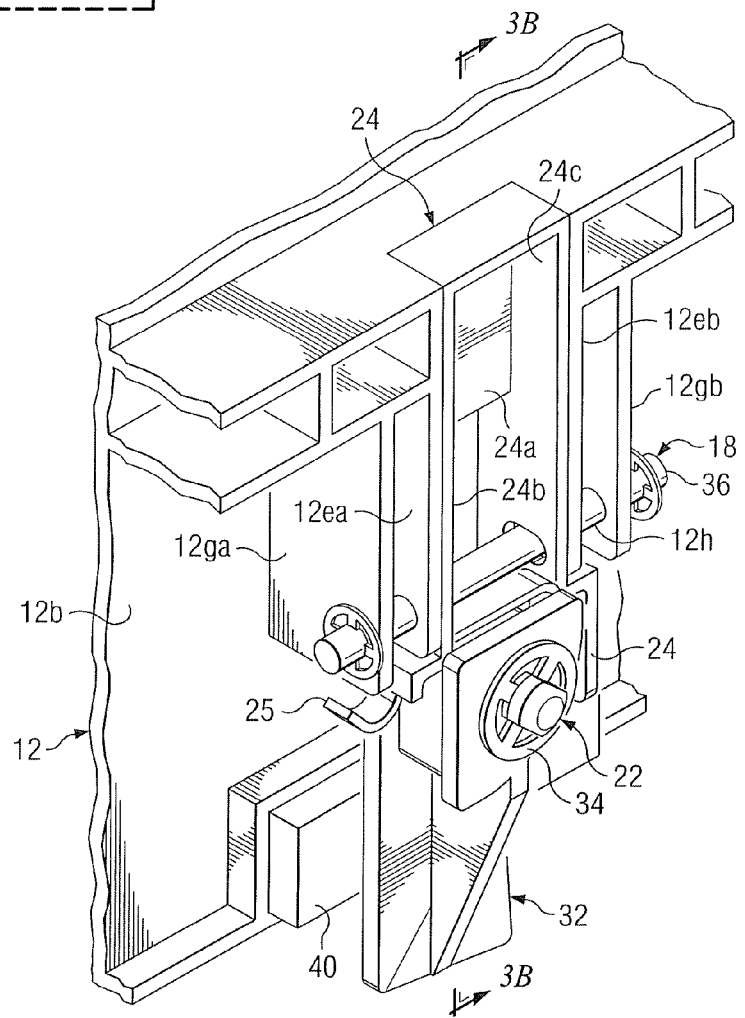
FIG. 3A is another perspective view of the air grille and securing assembly of FIG. 2, according to respective exemplary embodiments, the securing assembly including an adapter, a cup, a fastener, and a pawl, according to respective exemplary embodiments.
Figure 3B:
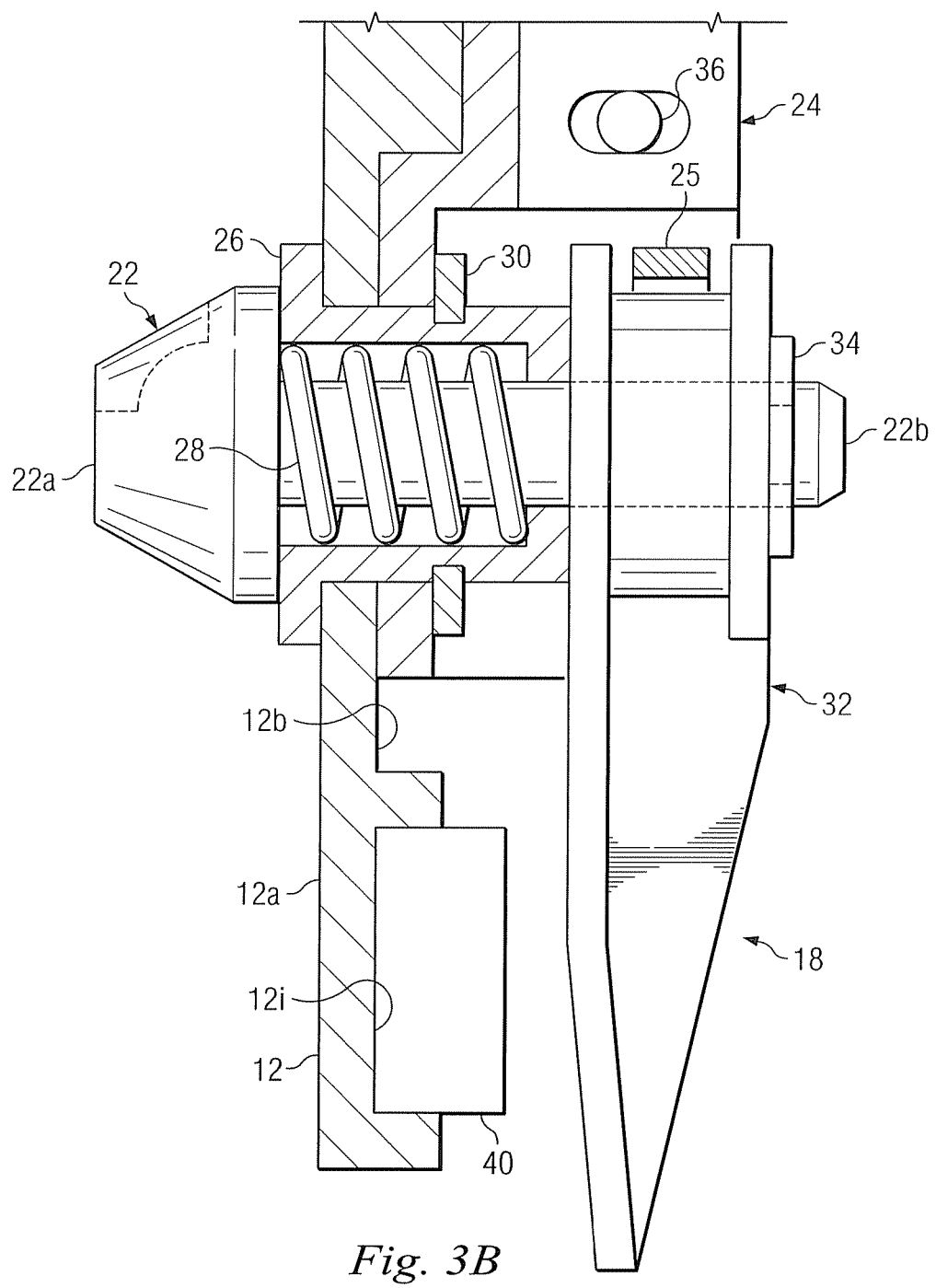
FIG. 3B is a sectional view of the air grille and securing assembly of FIG. 3A taken along line 3B-3B.
Figure 12:
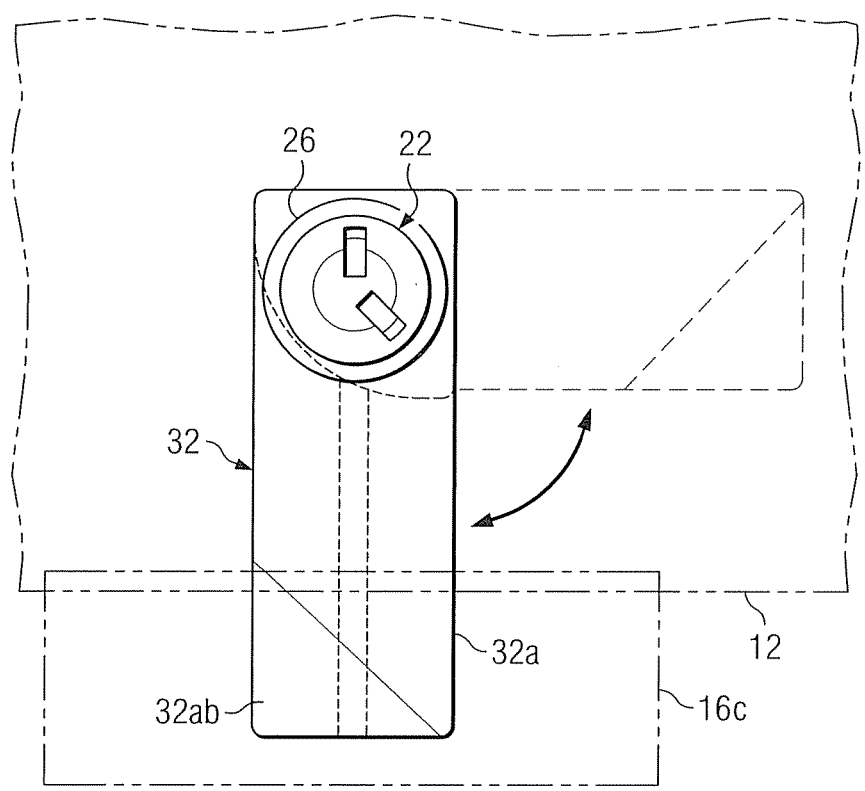
FIG. 12 is a simplified front elevational view depicting in solid line at least a portion of the assembly of FIG. 1 in the operational mode of FIGS. 3A and 3B, and depicting in broken line the portion of the assembly of FIG. 1 in the operational mode of FIG. 4.

During the clockwise rotation of the pawl 32, as viewed in FIGS. 1, 2 and 12, as the distal end of the plate 32a of the pawl 32 approaches the damper element 40 and/or the vertically-extending portion 16c of the aircraft structure 16, the corner portion 32ab of the pawl 32 is first to engage and/or pass over the damper element 40 and/or the portion 16c. The angular orientation of the corner portion 32ab prevents the pawl 32 from catching on, or interfering with, the damper element 40 and/or the portion 16c. If contact between the corner portion 32ab, and the damper element 40 and/or the portion 16c, does indeed occur, the angular orientation of the corner portion 32ab results in the surface 32aba just rubbing against, and sliding over, the damper element 40 and/or the portion 16c, thereby guiding the plate 32 over and past the damper element 40 and the portion 16c.

In an exemplary embodiment, after the pawl 32 has rotated approximately ninety degrees, any further rotation of the pawl 32 in a clockwise direction (as viewed in FIGS. 1, 2 and 12) is prevented or at least limited by the engagement between the surface 32cc of the block 32 and the wall 24e of the adapter 24.

In an exemplary embodiment, after the pawl 32 has rotated approximately ninety degrees, the round extending between the surfaces 32ca and 32cb of the block 32c no longer pushes up against the horizontal portion 25c. As a result, the horizontal portion 25c snaps back, or a least returns, to its normal horizontally-extending position. After the horizontal portion 25c of the flat spring 25 has returned to its normal position, the horizontal portion 25c contacts, or is proximate, the surface 32cb of the pawl 32, thereby maintaining the closed position of the assembly 18 by preventing the pawl 32 and thus the fastener 22 from rotating freely.

The assembly 20 is placed in its closed position in a manner substantially identical to the above-described manner by which the assembly 18 is placed in its closed position.

After the assemblies 18 and 20 have been placed in their respective closed positions as shown in FIGS. 11C and 12, the air grille 12 is secured to the aircraft structure 16.

In an exemplary embodiment, while the air grille 12 is secured to the aircraft structure 16, the damper element 40 is at least partially compressed between the air grille 12 and the portion 16c of the aircraft structure 16, thereby limiting shaking, vibration and/or other relative movement between the air grille 12 and the aircraft structure 16, and/or reducing any rattling and/or other noise that occurs due to any relative movement between the air grille 12 and the aircraft structure 16.

In an exemplary embodiment, while the air grille 12 is secured to the aircraft structure 16, the distal end of the plate 32a of the pawl 32 is proximate a horizontally-extending portion of the aircraft structure 16; as a result, any downward movement of the air grille 12 is limited to the relatively small offset between the distal end of the plate 32a and the horizontally-extending portion of the aircraft structure 16, thereby preventing the tabs 12j from unintentionally moving downward and out of the slots 16b, respectively, and further ensuring that the air grille 12 can only be removed from the aircraft structure 16 by operating the assemblies 18 and 20.

In an exemplary embodiment, to remove the air grille 12 from the aircraft structure 16, the assemblies 18 and 20 are placed in their respective open positions using the tool 42, in the manner described above, and the air grille 12 is then rotated clockwise, as viewed in FIGS. 11A, 11B and 11C, and the tabs 12j are removed from the slots 16b, respectively.

In an exemplary embodiment, while the air grille 12 is secured to the aircraft structure 16, the head 22a of the fastener 22 prevents, or at least resists against, tools other than the tool 42 from being used to place the assemblies 18 and 20 in their respective open positions to thereby remove the air grille 12 from the aircraft structure 16. More particularly, the surfaces 22m, 22n and 22o of the head 22 lie on different planes; as a result, this multi-plane surface contour defined by the slot 22j interrupts or disrupts the slot 22j, thereby preventing the use of standard tools, such as a flat-head screwdriver, to drive the fastener 22 and thus operate the assembly 18 or 20. Likewise, the surfaces 22s, 22t and 22u of the head 22 lie on different planes; as a result, this multi-plane surface contour defined by the slot 22p interrupts or disrupts the slot 22p, thereby preventing the use of standard tools to operate the assembly 18 or 20. Further, the depth dimension D of the slot 22j decreases as the dimension D moves radially inwardly toward the longitudinal center axis 22h, contrary to other fastener-head designs which utilize either a constant slot depth dimension or a slot depth dimension that increases as the depth dimension moves radially inwardly toward the longitudinal center axis; as a result, standard tools which are configured to engage these other fastener-head designs are thus unable to drive the fastener 22 and thereby operate the assembly 18 or 20. Moreover, the decrease of the depth dimension D of the slot 22j provides insufficient area for applied forces to grip the fastener 22 with standard tools. Likewise, the corresponding depth dimension D of the slot 22p decreases as the dimension D moves radially inwardly toward the longitudinal center axis 22h, contrary to other fastener-head designs which utilize either a constant slot depth dimension or a slot depth dimension that increases as the depth dimension moves radially inwardly toward the longitudinal center axis; as a result, standard tools which are configured to engage these other fastener-head designs are thus unable to drive the fastener 22 and thereby operate the assembly 18 or 20. Moreover, the decrease of the depth dimension D provides insufficient area for applied forces to grip the fastener 22 with standard tools. Still further, the angle 22v extends between two different planes, each of which is perpendicular to a plane on which both of the axes 22i and 22ia lie. Moreover, the angle 22v is neither 90 degrees nor 120 degrees, each of which is a standard angle between slots in a head in a standard fastener. Still further, the frusto-conical surface 22ad prevents, or at least resists, the easy gripping of the head 22a with pliers, a wrench or a similar gripping tool. In view of the foregoing, it is clear that the head 22a of the fastener 22 prevents, or at least resists against, any tampering with the assembly 18, the assembly 20, and/or the air grille 12, and/or the removal of the air grille 12 from the aircraft structure 16. As a result, the risk of compromising the securement of the air grille 12 to the aircraft structure 16 is eliminated or at least appreciably reduced.

Figure 13A:
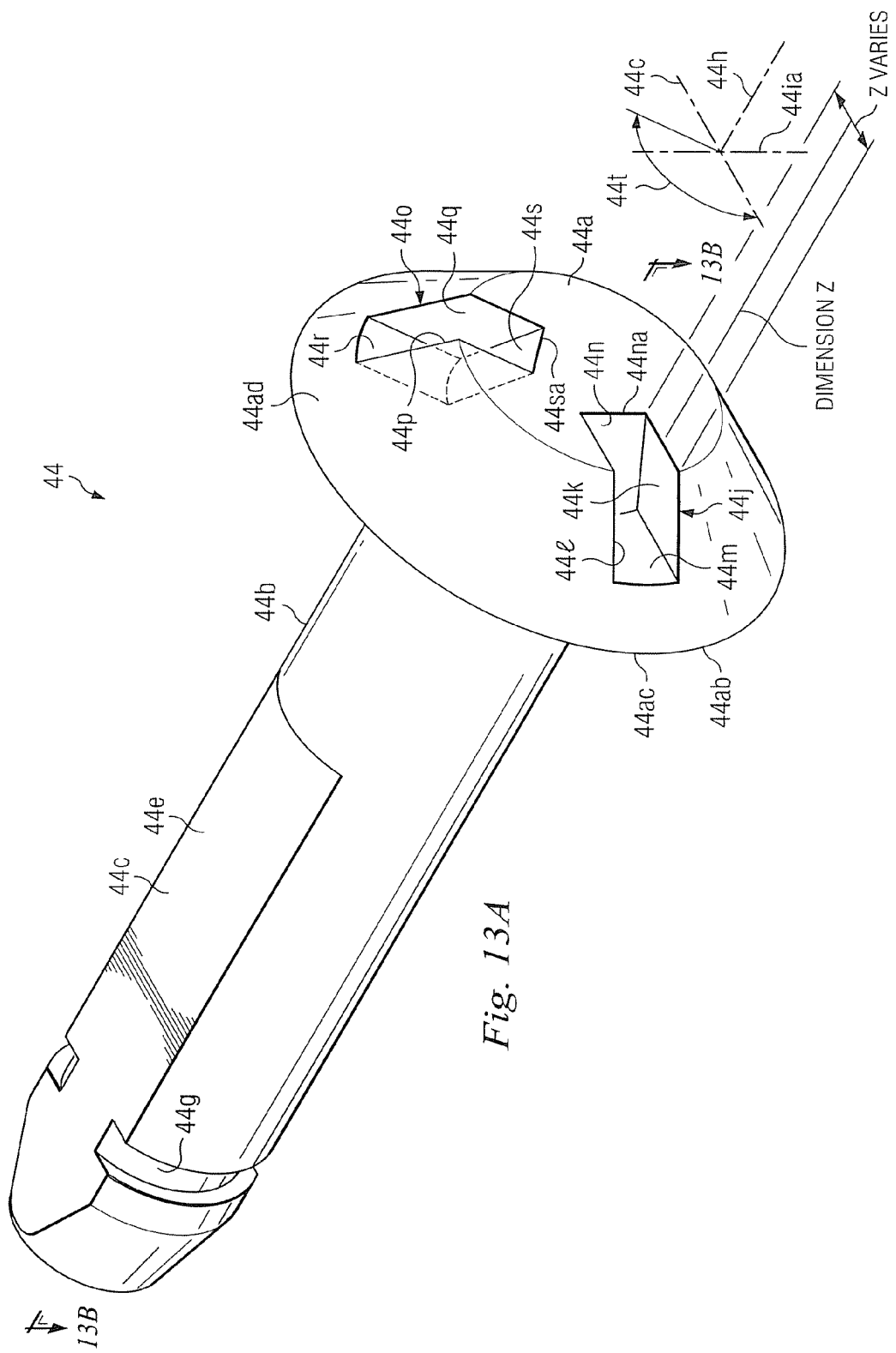
FIG. 13A is a perspective view of a fastener according to another exemplary embodiment.
Figure 13B:
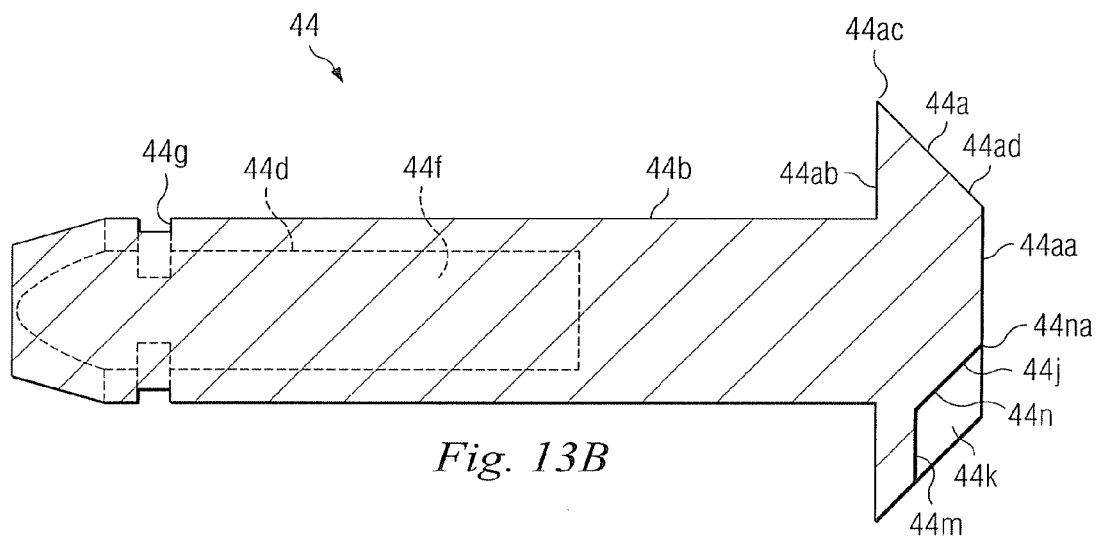
FIG. 13B is a sectional view of the fastener of FIG. 13A taken along line 13B-13B.

In an exemplary embodiment, as illustrated in FIGS. 13A and 13B with continuing reference to FIGS. 1, 2, 3A, 3B, 4, 5, 6A, 6B, 7, 8A, 8B, 9A, 9B, 10, 11A, 11B, 11C and 12, a fastener is generally referred to by the reference numeral 44 and includes a head 44a and a shank 44b extending therefrom. The head 44a defines a top side 44aa, a bottom side 44ab spaced in a parallel relation to the top side 44aa and defining a circumferentially-extending outer edge 44ac, and a tapered surface 44ad extending upwardly from the outer edge 44ac of the bottom side 44ab and tapering to the top side 44aa. Flats 44c and 44d are formed in the shank 44b and extend longitudinally from the distal end portion of the shank 44b to a point between the head 44a and the distal end portion of the shank 44b. The flats 44c and 44d define surfaces 44e and 44f, respectively, which surfaces are spaced in a parallel relation. An external annular recess 44g is formed in the distal end portion of the shank 44b. As a result of the flats 44c and 44d, the external annular recess 44g is discontinuous. The fastener 44 includes a longitudinal center axis 44h. An axis 44i is perpendicular to the longitudinal center axis 44h. An axis 44ia is perpendicular to each of the axes 44h and 44i.

A slot 44j is formed in the head 44a. The slot 44j defines parallel-spaced surfaces 44k and 44l, a flat surface 44m, and a flat surface 44n extending angularly from the flat surface 44m. The flat surface 44m is relatively proximate the bottom side 44ab of the head 44a, and defines a plane that is perpendicular to the longitudinal center axis 44h and parallel to the axes 44i and 44ia. The flat surface 44n extends angularly downward from the top side 44aa of the head 44a and to the flat surface 44m, and defines a plane that is parallel to the axis 44ia and angularly oriented with respect to the axes 44h and 44i. The flat surface 44n further defines an end 44na of the slot 44j. The flat surface 44m is radially positioned between the outer edge 44ac and the flat surface 44n.

As a result of the above-described design of the slot 44j, the depth of at least a portion of the slot 44j varies along a radial direction from the longitudinal axis 44h such as, for example, a radial direction corresponding to the direction of extension of the axis 44i from the axis 44h. More particularly, a depth dimension Z, which refers to a depth dimension that is parallel to the longitudinal center axis 44h and that can be measured from any point along the longitudinal center axis 44h at or above the end 44na of the slot 44j such as, for example, the position of the axis 44i along the axis 44h as shown in FIG. 13A, varies along a radial direction from the axis 44h such as, for example, the radial direction corresponding to the direction of extension of the axis 44i from the axis 44h. The dimension Z varies along a radial direction from the longitudinal center axis 44h by increasing as the dimension Z moves radially outwardly away from the longitudinal center axis 44h, and by decreasing as the dimension Z moves radially inwardly towards the longitudinal center axis 44h.

A slot 44o is formed in the head 44a. The slot 44o defines parallel-spaced surfaces 44p and 44q, a flat surface 44r, and a flat surface 44s extending angularly from the flat surface 44m. The flat surface 44r is relatively proximate the bottom side 44ab of the head 44a, and defines a plane that is perpendicular to the longitudinal center axis 44h and parallel to the axes 44i and 44ia. The flat surface 44s extends angularly downward from the top side 44aa of the head 44a and to the flat surface 44r, and defines a plane that is parallel to the axis 44ia and angularly oriented with respect to the axes 44h and 44i. The flat surface 44s further defines an end 44sa of the slot 44o. The flat surface 44r is radially positioned between the outer edge 44ac and the flat surface 44s.

As a result of the above-described design of the slot 44o, the depth of at least a portion of the slot 44o varies along a radial direction from the longitudinal center axis 44h, in a manner similar to the above-described manner by which the depth of at least a portion of the slot 44j varies along a radial direction from the longitudinal center axis 44h.

An angle 44t is defined between the slots 44j and 44p. The angle 44t is the angle between the respective directions of radial extension of the slots 44j and 44p from the longitudinal center axis 44h. In an exemplary embodiment, the angle 44t is 135 degrees. In an exemplary embodiment, the angle 44t is greater than 120 degrees and less than 180 degrees.

In an exemplary embodiment, the fastener 44 is substituted in place of the fastener 22 in the assembly 18. In an exemplary embodiment, the fastener 44 is substituted in place of the fastener 22 in the assembly 20.

Figure 14:
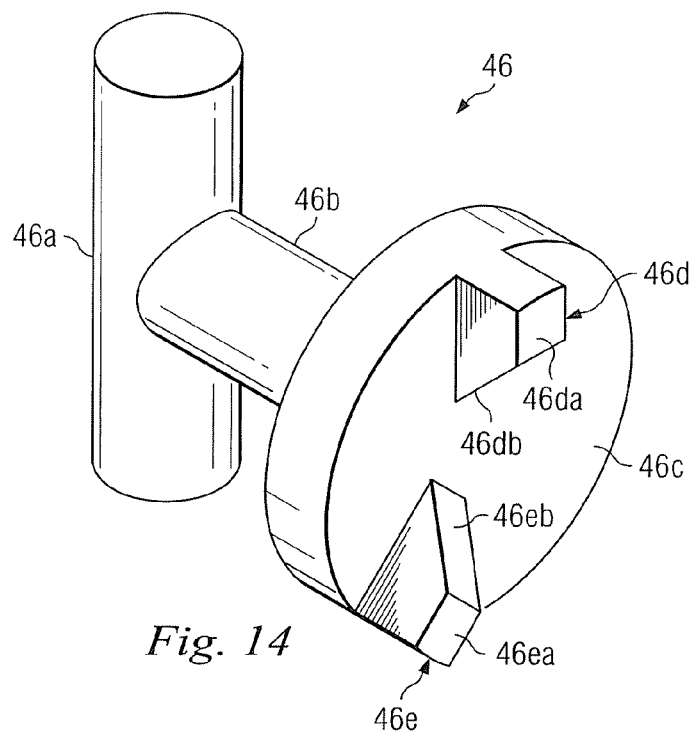
FIG. 14 is a perspective view of a tool adapted to engage the fastener of FIGS. 13A and 13B.
Figure 15:
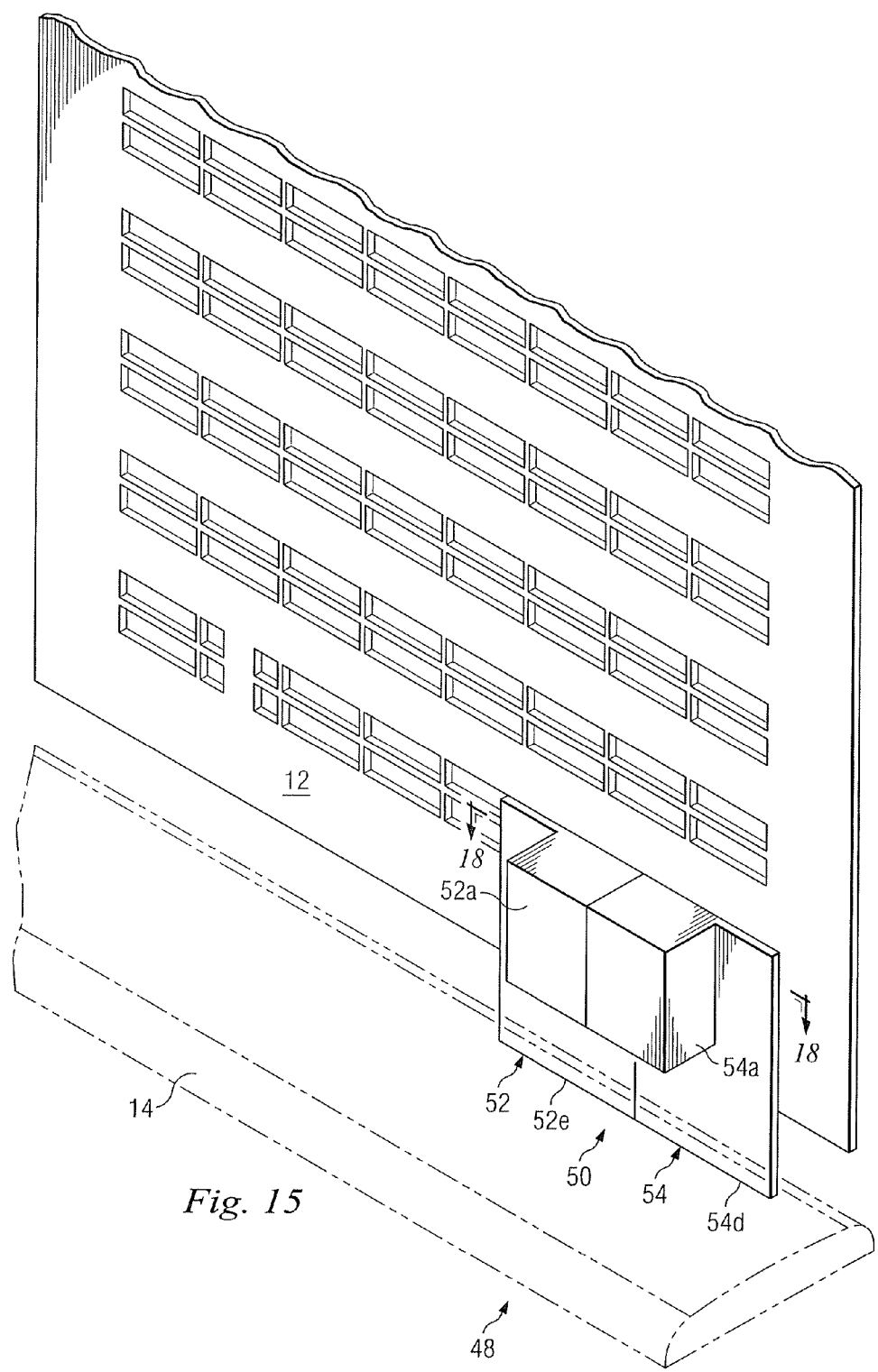
FIG. 15 is a perspective view of a system according to another exemplary embodiment, the system including an air grille, a trim strip, aircraft structure, and a securing assembly, according to respective exemplary embodiments.
Figure 16:
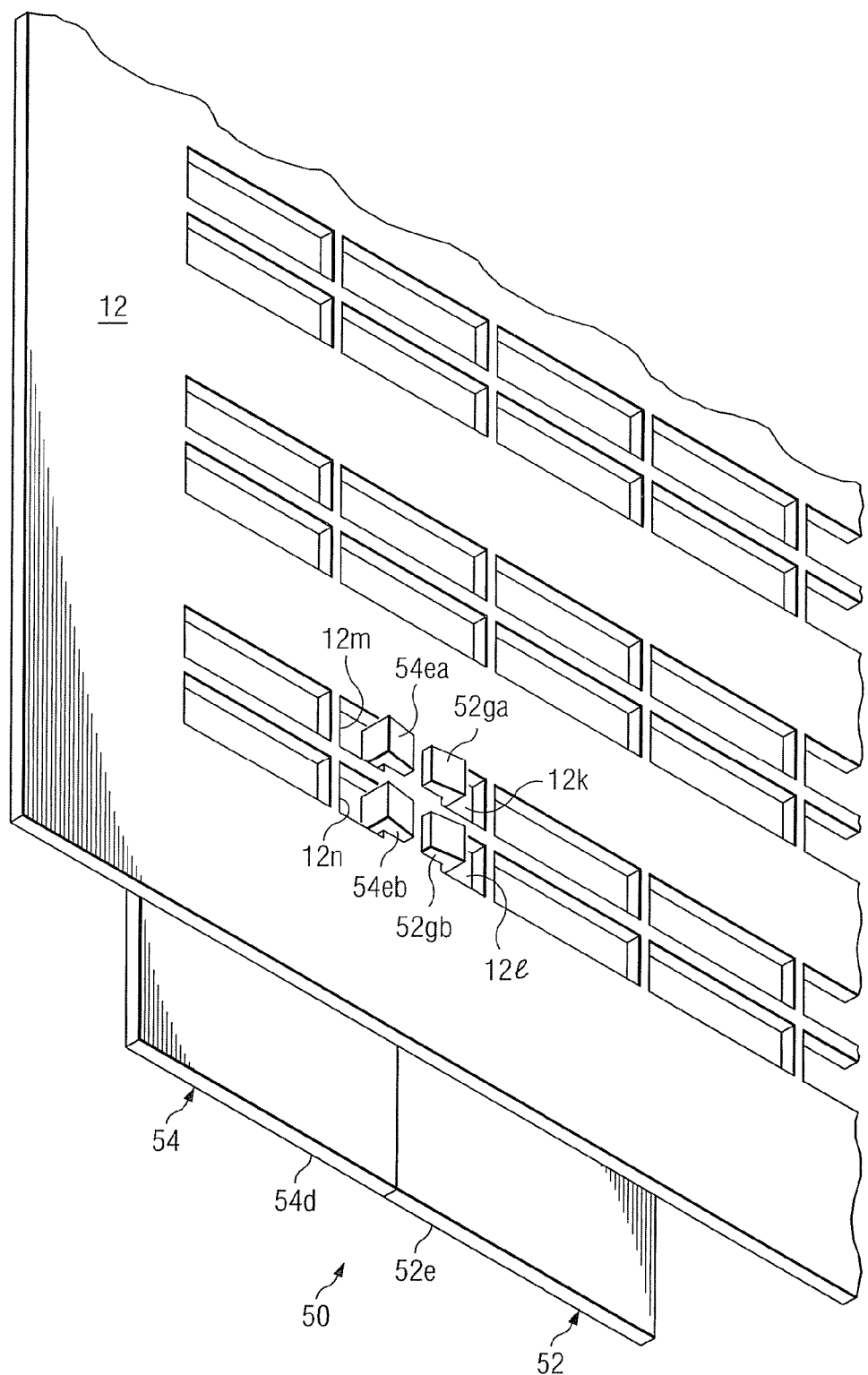
FIG. 16 is another perspective view of the air grille and securing assembly of FIG. 15, according to respective exemplary embodiments.
Figure 17:
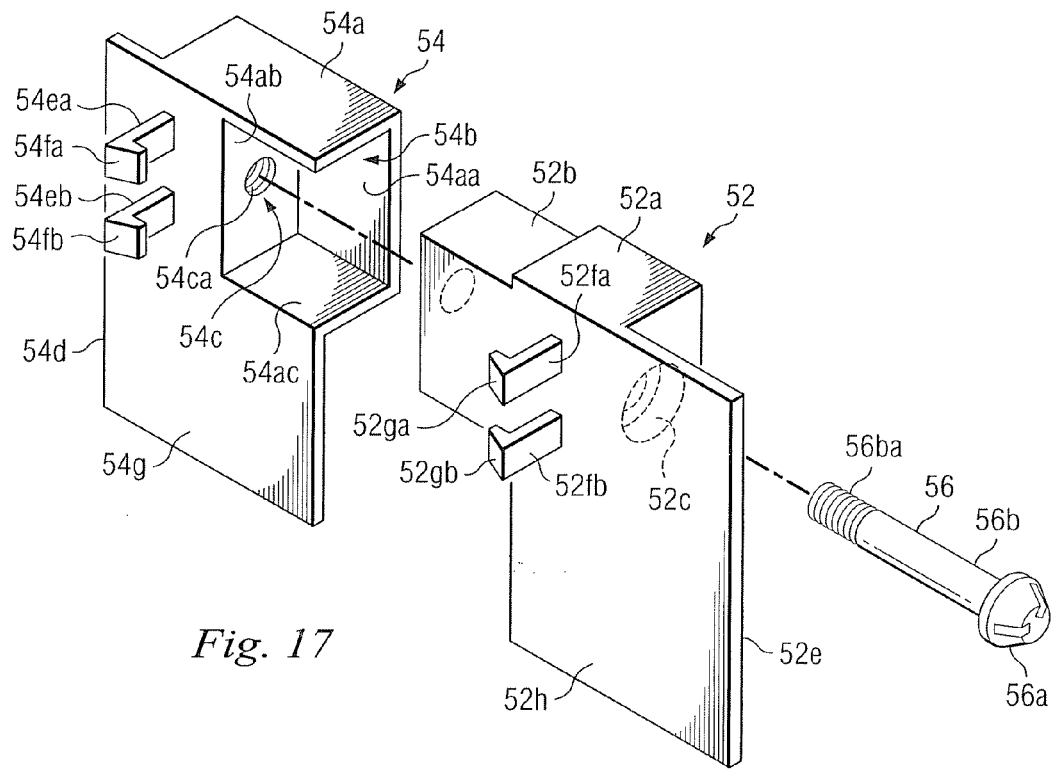
FIG. 17 is an exploded view of the assembly of FIGS. 15 and 16, according to an exemplary embodiment.
Figure 18:
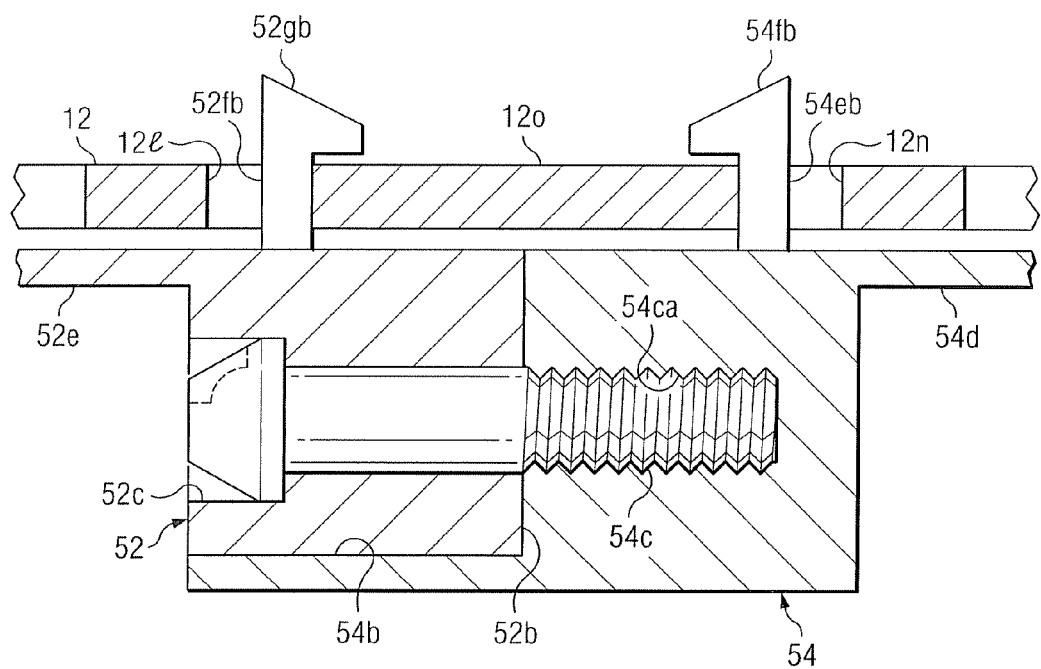
FIG. 18 is a sectional view of the air grille and securing assembly of FIGS. 15 and 16 taken along line 18-18.

In an exemplary embodiment, as illustrated in FIG. 14 with continuing reference to FIGS. 1, 2, 3A, 3B, 4, 5, 6A, 6B, 7, 8A, 8B, 9A, 9B, 10, 11A, 11B, 11C, 12, 13A and 13B, a tool is generally referred to by the reference numeral 46 and is adapted to drive the fastener 44. The tool 46 includes a T-handle 46a and a shank 46b extending therefrom. A disc-shaped head 46c extends from the end of the shank 46b opposing the T-handle 46a. Projections 46d and 46e extend from the head 46c and are adapted to extend within the slots 44j and 44o, respectively, of the fastener 44. The projection 46d defines a flat surface 46da spaced in a parallel relation to the head 46c, and an angularly-extending surface 46db extending radially inwardly from the flat surface 46da to the head 46c. The surfaces 46da and 46db are configured to contact, and/or at least accommodate, the above-described multi-plane surface contour defined by the slot 44j, that is, the surfaces 44m and 44n, respectively. Likewise, the projection 46e defines a flat surface 46ea spaced in a parallel relation to the head 46c, and an angularly-extending surface 46eb extending radially inwardly from the flat surface 46ea to the head 46c. The surfaces 46ea and 46eb are configured to contact, and/or at least accommodate, the above-described multi-plane surface contour defined by the slot 44o, that is, the surfaces 44r and 44s, respectively. An angle 46f is defined between the projections 46d and 46e. The angle 46f is equal to the angle 22v of the fastener 22. In an exemplary embodiment, the angle 46f is greater than 120 degrees and less than 180 degrees. In an exemplary embodiment, instead of the T-handle 46a, the tool 46 includes one or more other types of handles including, for example, a screwdriver handle.

In operation, in an exemplary embodiment, when the fastener 44 is substituted in place of the fastener 22 in the assemblies 18 and/or 20, the tool 46 is used in place of the tool 42 to drive the respective fasteners 44 in the assemblies 18 and/or 20 and thus place the assemblies 18 and/or 20 in their respective open and closed positions, in accordance with the foregoing.

In operation, in an exemplary embodiment, when the fastener 44 is substituted in place of the fastener 22 in the assemblies 18 and/or 20, and while the air grille 12 is secured to the aircraft structure 16, the head 44a of the fastener 44 prevents, or at least resists against, tools other than the tool 46 from being used to place the assemblies 18 and/or 20 in their respective open positions to thereby remove the air grille 12 from the aircraft structure 16. More particularly, the surfaces 44m and 44n of the head 44 lie on different planes; as a result, this multi-plane surface contour defined by the slot 44j interrupts or disrupts the slot 44j, thereby preventing the use of standard tools, such as a flat-head screwdriver, to drive the fastener 44 and thus operate the assembly 18 and/or 20. Likewise, the surfaces 44r and 44s of the head 44 lie on different planes; as a result, this multi-plane surface contour defined by the slot 44o interrupts or disrupts the slot 44o, thereby preventing the use of standard tools to operate the assembly 18 and/or 20. Further, the depth dimension Z of the slot 44j decreases as the dimension D moves radially inwardly toward the longitudinal center axis 44h, contrary to other fastener-head designs which utilize either a constant slot depth dimension or a slot depth dimension that increases as the depth dimension moves radially inwardly toward the longitudinal center axis; as a result, standard tools which are configured to engage these other fastener-head designs are thus unable to drive the fastener 44 and thereby operate the assembly 18 and/or 20. Moreover, the decrease of the depth dimension Z of the slot 44j provides insufficient area for applied forces to grip the fastener 44 with standard tools. Likewise, the corresponding depth dimension Z of the slot 44o decreases as the dimension Z moves radially inwardly toward the longitudinal center axis 44h, contrary to other fastener-head designs which utilize either a constant slot depth dimension or a slot depth dimension that increases as the depth dimension moves radially inwardly toward the longitudinal center axis; as a result, standard tools which are configured to engage these other fastener-head designs are thus unable to drive the fastener 44 and thereby operate the assembly 18 and/or 20. Moreover, the decrease of the depth dimension D provides insufficient area for applied forces to grip the fastener 44 with standard tools. Still further, the angle 44v extends between two different planes, each of which is perpendicular to a plane on which both of the axes 44i and 44ia lie. Moreover, the angle 44v is neither 90 degrees nor 120 degrees, each of which is a standard angle between slots in a head in a standard fastener. Still further, the frusto-conical surface 44ad prevents, or at least resists, the easy gripping of the head 44a with pliers, a wrench or a similar gripping tool. In view of the foregoing, it is clear that the head 44a of the fastener 44 prevents, or at least resists against, any tampering with the assembly 18, the assembly 20, and/or the air grille 12, and/or the removal of the air grille 12 from the aircraft structure 16. As a result, the risk of compromising the securement of the air grille 12 to the aircraft structure 16 is eliminated or at least appreciably reduced.

In an exemplary embodiment, as illustrated in FIGS. 15, 16, 17 and 18 with continuing reference to FIGS. 1, 2, 3A, 3B, 4, 5, 6A, 6B, 7, 8A, 8B, 9A, 9B, 10, 11A, 11B, 11C, 12, 13A, 13B and 14, a system is generally referred to by the reference numeral 48 and includes the air grille 12, the lower portion of which is proximate the trim strip 14. The air grille 12 is engaged with the aircraft structure 16 (not shown), and a securing assembly 50 is coupled to the air grille 12. The securing assembly 50 secures the air grille 12 to the aircraft structure 16.

The securing assembly 50 includes a plug portion 52, a receptacle portion 54, and a fastener 56 adapted to couple the portions 52 and 54 together. The plug portion 52 includes a block 52a from which a protrusion 52b extends, and a counterbore 52c extending through the block 52a and the protrusion 52b, in a direction corresponding to the direction of extension of the protrusion 52b from the block 52a. A plate 52e extends downwardly along and from the block 52a. Projections 52fa and 52fb extend from the block 52a, and tabs 52ga and 52gb extend transversely from the distal ends of the projections 52fa and 52fb, respectively. A vertically-extending surface 52h is defined by the block 52a, the protrusion 52b, and the plate 52e.

The receptacle portion 54 includes a block 54a and a cavity 54b formed therein, the cavity 54b defining internal surfaces 54aa, 54ab and 54ac of the block 54a. A bore 54c having an internal threaded connection 54ca is formed in the surface 54ab and extends into the block 54a. A plate 54d extends downwardly along and from the block 54a. Projections 54ea and 54eb extend from the block 54a, and tabs 54fa and 54fb extend transversely from the distal ends of the projections 54ea and 54eb, respectively. A vertically-extending surface 54g is defined by the block 54a and the plate 54d.

The fastener 56 includes a head 56a and a shank 56b extending therefrom, the shank 56b including an external threaded connection 56ba. In an exemplary embodiment, the head 56a is substantially identical to the head 22a of the fastener 22. In an exemplary embodiment, the head 56a is substantially identical to the head 44*a* of the fastener 44. In an exemplary embodiment, the head 56*a* includes one or more tamper-resistant features, such as, for example, one or more of the above-described tamper-resistant features of the head 22*a*, one or more of the above-described tamper-resistant features of the head 44*a*, one or more other tamper-resistant features, and/or any combination thereof.

In an exemplary embodiment, to secure the air grille 12 to the aircraft structure 16, the plate 52*e* of the plug portion 52 is positioned between the trim strip 14 and the air grille 12, and the projections 52*fa* and 52*fb* of the plug portion 52 are inserted into vertically-spaced openings 12*k* and 12*l*, respectively, in the air grille 12. The plate 54*d* of the receptacle portion 54 is positioned between the trim strip 14 and the air grille 12, and the projections 54*ea* and 54*eb* are inserted into vertically-spaced openings 12*m* and 12*n*, respectively, in the air grille 12. The openings 12*k* and 12*m* are vertically aligned with each other, and the openings 12*l* and 12*n* are vertically aligned with each other. In an exemplary embodiment, in response to the positioning of the plate 54*d* and the insertion of the projections 54*ea* and 54*eb*, the protrusion 52*b* is at least partially received within the cavity 54*b*.

After the projections 52*fa* and 52*fb* have been inserted in the openings 12*k* and 12*l*, respectively, and the projections 54*ea* and 54*eb* have been inserted in the openings 12*m* and 12*n*, respectively, the portions 52 and 54 are then moved horizontally towards each other, thereby causing the protrusion 52*b* to be received within the cavity 54*b*. The portions 52 and 54 continue to be moved towards each other until one or more of the following occurs: the distal end of the protrusion 52*b* contacts the surface 54*ab*, the projections 52*fa* and 54*ea* contact one side of a vertically-extending portion 12*o* of the air grille 12 extending between the openings 12*k* and 12*m* and between the openings 12*l* and 12*n*, and the projections 52*fb* and 54*eb* contact the other side of the vertically-extending portion 12*o* of the air grille 12. As a result, at least a portion of each of the tabs 52*ga*, 52*gb*, 54*fa* and 54*fb* extends over the vertically-extending portion 12*o* on the side 12*b* of the air grille 12. Moreover, the counterbore 52*c* is axially aligned with the bore 54*c*.

After at least a portion of each of the tabs 52*ga*, 52*gb*, 54*fa* and 54*fb* extends over the vertically-extending portion 12*o* on the side 12*b* of the air grille 12, and the counterbore 52*c* is axially aligned with the bore 54*c*, the fastener 56 is inserted through the counterbore 52*c* and into the bore 54*c*, and the external threaded connection 56*ba* of the fastener 56 is threadably engaged with the internal threaded connection 54*ca*, thereby coupling the portions 52 and 54 together. As a result, the air grille 12 is secured to the aircraft structure 16. More particularly, the portions 52 and 54 are unable to be pulled apart and thus the vertically-extending portion 12*o* of the air grille 12 is trapped between the projections 52*fa* and 54*ea*, and the projections 52*fb* and 54*eb*, and the plates 52*e* and 54*d* are trapped between the trim strip 14 and the air grille 12, and the portion of the air grille 12 below the tabs 12*j* is trapped between the slots 16*a* of the aircraft structure 16 and a horizontally-extending portion of the aircraft which the respective lower ends of the plates 52*e* and 54*d* contact, such as a floorboard of the aircraft. The air grille 12 is unable to swing away from the aircraft structure 16, in either a clockwise or counterclockwise direction, because the tabs 12*j* extend within the respective slots 16*a* and the plates 52*e* and 54*d* extend between the trim strip 14 and the aircraft structure 16. The air grille 12 is unable to move vertically downwards because the respective lower ends of the plates 52*e* and 54*d* contact a horizontally-extending portion of the aircraft. The air grille 12 is unable to move vertically upward, or side to side, because of the extension of the tabs 12*j* into the respective slots 16*a* of the aircraft structure 16.

In an exemplary embodiment, instead of, or in addition to extending between the air grille 12 and the trim strip 14, the plates 52*e* and 54*d* extend between the air grille 12 and another vertically-extending portion of the aircraft, such as, for example, a vertically-extending portion that either is, includes, or is spaced in a parallel relation to, the vertically-extending portion 16*c* of the aircraft structure 16.

In operation, in an exemplary embodiment, when the air grille 12 is secured to the aircraft structure 16 as a result of engagement of the portions 52 and 54 with the air grille 12 and the coupling together of the portions 52 and 54 in the manner described above, the above-described tamper-resistant features of the head 56*a* of the fastener 56 prevent, or at least resist against, the decoupling of the portions 52 and 54, thereby preventing, or at least resisting against, any tampering with the assembly 50, and/or the air grille 12, and/or the removal of the air grille 12 from the aircraft structure 16. As a result, the risk of compromising the securement of the air grille 12 to the aircraft structure 16 is eliminated or at least appreciably reduced.

In an exemplary embodiment, if the head 56*a* is substantially identical to the head 22*a*, then the head 46*a* prevents, or at least resists against, tools other than the tool 42 from being used to decouple the portions 52 and 54 to thereby remove the air grille 12 from the aircraft structure 16. In an exemplary embodiment, if the head 56*a* is substantially identical to the head 44*a*, then the head 56*a* prevents, or at least resists against, tools other than the tool 46 from being used to decouple the portions 52 and 54 to thereby remove the air grille 12 from the aircraft structure 16.

Figure 19:
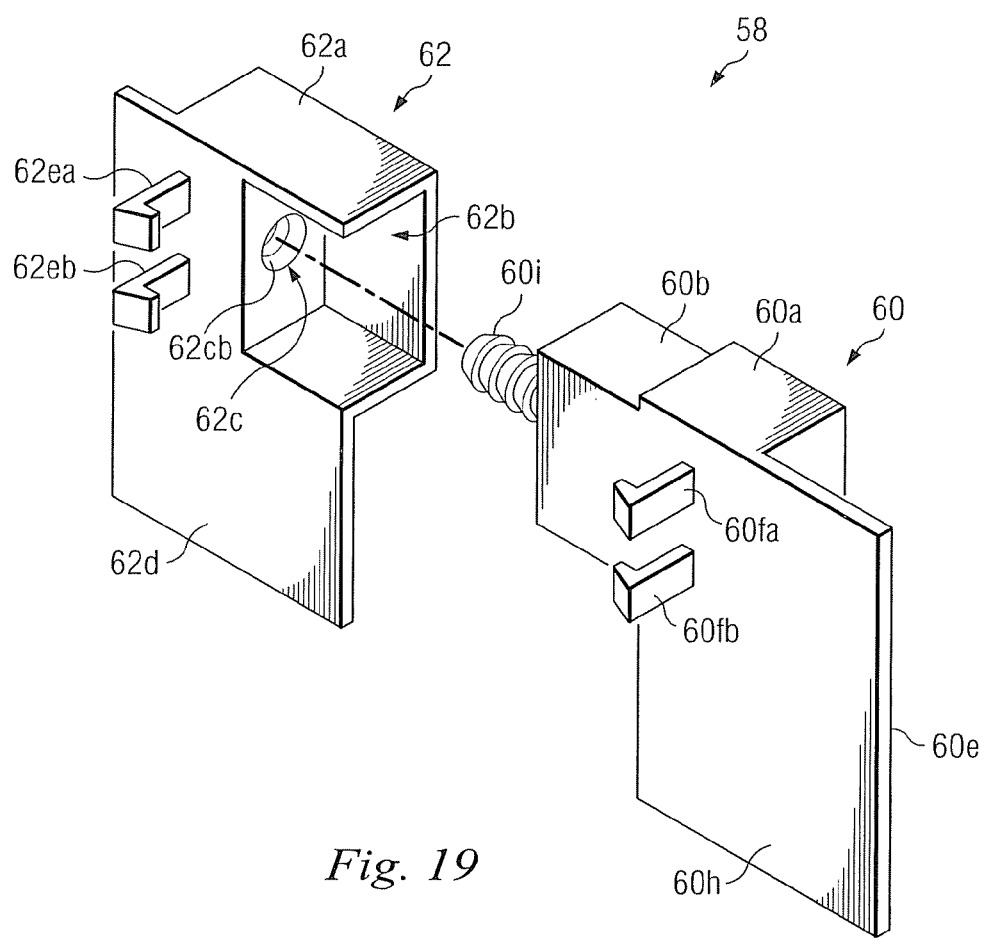
FIG. 19 is an exploded view of a securing assembly according to another exemplary embodiment.

In an exemplary embodiment, as illustrated in FIG. 19 with continuing reference to FIGS. 1, 2, 3A, 3B, 4, 5, 6A, 6B, 7, 8A, 8B, 9A, 9B, 10, 11A, 11B, 11C, 12, 13A, 13B, 14, 15, 16, 17 and 18, a securing assembly is generally referred to by the reference numeral 58 and includes a plug portion 60 and a receptacle portion 62. The plug portion 60 contains several features which are identical to corresponding features of the plug portion 52 of the assembly 50; therefore, reference numerals used to refer to features of the plug portion 60 will correspond to reference numerals used to refer to features of the plug portion 52, except that the prefix for the reference numerals used to describe the plug portion 52, that is, 52, will be replaced with the prefix of the plug portion 60, that is, 60. As shown in FIG. 19, instead of a feature identical to the counterbore 52*c* of the plug portion 52, the plug portion 60 includes a barbed projection 60*i* extending from protrusion 60*b*.

The receptacle portion 62 contains several features which are identical to corresponding features of the receptacle portion 54 of the assembly 50; therefore, reference numerals used to refer to features of the receptacle portion 62 will correspond to reference numerals used to refer to features of the receptacle portion 54, except that the prefix for the reference numerals used to describe the receptacle portion 54, that is, 54, will be replaced with the prefix of the receptacle portion 62, that is, 62. As shown in FIG. 19, instead of a feature identical to the bore 62*c* having an internal threaded connection identical to the internal threaded connection 54*ca*, the bore 62*c* of the receptacle portion 62 has a plurality of radially inwardly extending rings 62*cb* for permitting the barbed projection 60*i* to be inserted into the bore 62*c*, but preventing the barbed projection 60*i* from being removed out of the bore 62*c*.

In an exemplary embodiment, the assembly 58 is coupled to the air grille 12 in a manner substantially similar to the manner by which the assembly 50 is coupled to the air grille 12, except that, instead of using the fastener 56, the barbed projection 60i is inserted into, and locked within, the bore 62c. In an exemplary embodiment, the assembly 58 secures the air grille 12 to the aircraft structure 16 in a manner substantially similar to the manner by which the assembly 50 secures the air grille 12 to the aircraft structure 16. In an exemplary embodiment, instead of using either the tool 42 or the tool 46 to decouple the portions 60 and 62, a drill is used to drill out the barbed projection 60i from the bore 62c and thereby decouple the portions 60 and 62, or a non-standard tool specially designed to release the barbed projection 60i from the bore 62c is used to decouple the portions 60 and 62.

Figure 20:
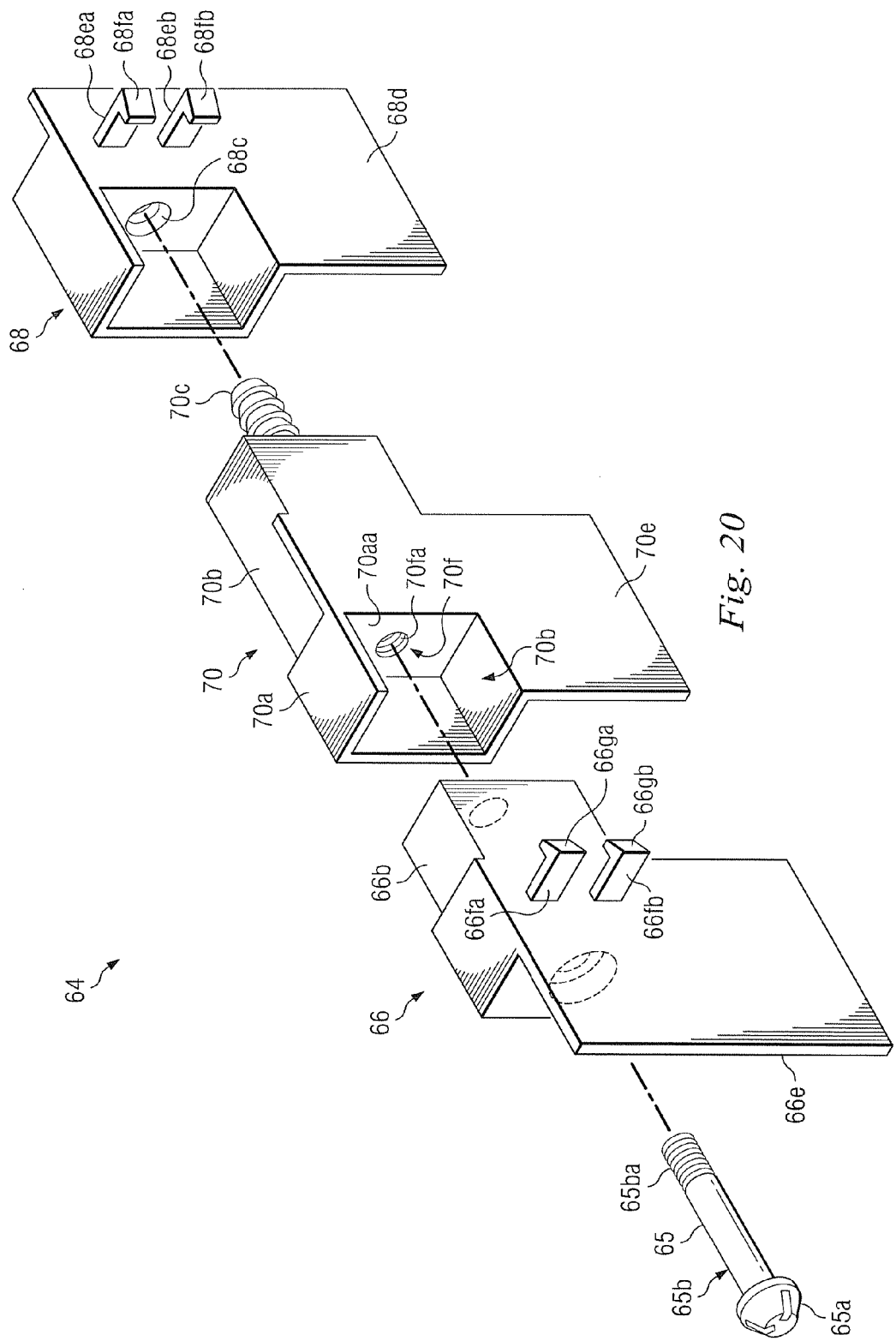
FIG. 20 is an exploded view of a securing assembly according to yet another exemplary embodiment.

In an exemplary embodiment, as illustrated in FIG. 20 with continuing reference to FIGS. 1, 2, 3A, 3B, 4, 5, 6A, 6B, 7, 8A, 8B, 9A, 9B, 10, 11A, 11B, 11C, 12, 13A, 13B, 14, 15, 16, 17, 18 and 19, an assembly is generally referred to by the reference numeral 64 and includes a fastener 65, a plug portion 66, a receptacle portion 68, and an extension portion 70 extending between the portions 66 and 68. The plug portion 66 is the symmetric equivalent to the plug portion 52, about a plane that is parallel to the plane defined by the end of the protrusion 52b of the plug portion 52, and therefore the plug portion 66 will not be described in further detail. Therefore, reference numerals used to refer to features of the plug portion 66 will correspond to reference numerals used to refer to features of the plug portion 52, except that the prefix for the reference numerals used to describe the plug portion 52, that is, 52, will be replaced with the prefix of the plug portion 66, that is, 66.

The receptacle portion 68 is the symmetric equivalent to the receptacle portion 54, about a plane that is parallel to the plane defined by the surface 54ab of the receptacle portion 54, and therefore the receptacle portion 68 will not be described in detail. Therefore, reference numerals used to refer to features of the receptacle portion 68 will correspond to reference numerals used to refer to features of the receptacle portion 54, except that the prefix for the reference numerals used to describe the receptacle portion 54, that is, 54, will be replaced with the prefix of the receptacle portion 68, that is, 68.

The fastener 65 is substantially identical to the fastener 56 and therefore the fastener 65 will not be described in detail. Therefore, reference numerals used to refer to features of the fastener 65 will correspond to reference numerals used to refer to features of the fastener 56, except that the prefix for the reference numerals used to describe the fastener 56, that is, 56, will be replaced with the prefix of the fastener 65, that is, 65.

As shown in FIG. 20, the extension portion 70 includes a block 70a in which a cavity 70b is formed, the cavity 70b defining a surface 70aa of the block 70a. A protrusion 70c extends from the block 70a, and a barbed projection 70d extends from the protrusion 70c. A plate 70e extends along and from the block 70a and the protrusion 70c. A bore 70f having an internal threaded connection 70fa is formed in the surface 70aa and extends into the block 70a and the protrusion 70b.

In an exemplary embodiment, to secure the air grille 12 to the aircraft structure 16, the plate 66e of the plug portion 66 is positioned between the trim strip 14 and the air grille 12, and the projections 66fa and 66fb of the plug portion 66 are inserted into vertically-spaced openings 12m and 12n, respectively, in the air grille 12. The plate 70e of the extension portion 70 is positioned between the trim strip 14 and the air grille 12, and the plug portion 66 and extension portion 70 are moved horizontally towards each other, thereby causing the protrusion 66b to be received within the cavity 70b. The portions 66 and 70 continue to be moved towards each other until one or more of the following occurs: the distal end of the protrusion 66b contacts the surface 70aa of the extension portion 70, and the projections 66fa and 66gb contact one side of the vertically-extending portion 12o of the air grille 12. As a result, at least a portion of each of the tabs 66ga and 66gb extends over the vertically-extending portion 12o on the side 12b of the air grille 12. Moreover, the counterbore 66c is axially aligned with the bore 68c. The fastener 65 is inserted through the counterbore 66c and into the bore 68c, and the external threaded connection 56ba of the fastener 56 is threadably engaged with the internal threaded connection 70fa, thereby coupling the portions 66 and 70 together. The plate 68d of the receptacle portion 68 is then positioned between the trim strip 14 and the air grille 12, and the projections 68e8 and 68eb are inserted into respective vertically-spaced openings in the air grille 12, which are vertically aligned with the openings 12m and 12n, respectively. In an exemplary embodiment, in response to the positioning of the plate 68d and the insertion of the projections 68ea and 68eb, the protrusion 70b is at least partially received within the cavity 68b. The portion 68 is then moved horizontally towards the extension portion 70, thereby causing the protrusion 70b to be received within the cavity 68b. The portion 68 continues to be moved towards the portion 70 until one or more of the following occurs: the distal end of the protrusion 70b contacts the surface 68ab, and the projections 68ea and 68eb contact one side of a vertically-extending portion of the air grille 12 spaced in a parallel relation to the vertically-extending portion 12o. As a result, at least a portion of each of the tabs 68fa and 68fb extends over the vertically-extending portion spaced in a parallel relation to the vertically-extending portion 12o. Moreover, the barbed projection 70c extends and is locked within the bore 68c, thereby coupling the portions 70 and 68 together. As a result, the air grille 12 is secured to the aircraft structure 16.

In an exemplary embodiment, instead of, or in addition to extending between the air grille 12 and the trim strip 14, the plates 66e, 70e and 68d extend between the air grille 12 and another vertically-extending portion of the aircraft, such as, for example, a vertically-extending portion that either is, includes, or is spaced in a parallel relation to, the vertically-extending portion 16c of the aircraft structure 16.

In operation, in an exemplary embodiment, when the air grille 12 is secured to the aircraft structure 16 as a result of engagement of the portions 66 and 68 with the air grille 12, the coupling together of the portions 66 and 70, and the coupling together of the portions 70 and 68, in the manner described above, the tamper-resistant features of the head 65a of the fastener 65, and the locking of the barbed projection 70c within the bore 68c, prevent, or at least resist against, the decoupling of the portions 66, 68 and 70, thereby preventing, or at least resisting against, any tampering with the assembly 64, and/or the air grille 12, and/or the removal of the air grille 12 from the aircraft structure 16. As a result, the risk of compromising the securement of the air grille 12 to the aircraft structure 16 is eliminated or at least appreciably reduced.

A system has been described that includes an aircraft air-return grille, the grille defining first and second sides, the second side of the grille defining a surface contour, the grille comprising a first bore extending therethrough; an aircraft structure, the aircraft structure comprising an opening adapted to be covered by the grille; an assembly coupled to the grille for securing the grille to the aircraft structure, the assembly comprising a fastener having a longitudinal axis and comprising a tamper-resistant head, the tamper-resistant head defining first and second sides spaced in a parallel relation, the second side of the tamper-resistant head defining a circumferentially-extending edge or surface, the tamper-resistant head comprising first and second slots formed therein, each of the first and second slots defining a multi-plane surface contour for interrupting the respective slot, and a depth dimension that is parallel to the longitudinal axis, and varies along a radial direction from the longitudinal axis by increasing as the depth dimension moves radially outwardly away from the longitudinal axis and decreasing as the depth dimension moves radially inwardly towards the longitudinal axis; and a frusto-conical surface extending from the circumferentially-extending edge or surface and tapering to the first side; wherein a first angle is defined between the first and second slots, the first angle being greater than 120 degrees and less than 180 degrees; a shank extending from the tamper-resistant head; and a first external annular recess formed in the distal end portion of the shank; a cup extending through the first bore of the grille, the cup comprising a counterbore through which the shank of the fastener extends, the counterbore defining an enlarged-diameter region, an external annular lip contacting the first side of the grille, and a second external annular recess; a helical spring disposed in the enlarged-diameter region of the cup; an adapter comprising a first wall contacting and accommodating the surface contour defined by the second side of the grille, a second bore through which the cup extends, the second bore being formed through the first wall, second and third walls spaced in a parallel relation and extending from the first wall, and a region at least partially defined by the first, second and third walls; a first ring extending within the second external annular recess of the cup so that the grille and the first wall of the adapter are disposed between the external annular lip of the cup and the first ring; a flat spring coupled to the adapter, the flat spring comprising a horizontally-extending portion extending between the third and fourth walls of the adapter; a pawl comprising a block at least partially disposed in the region of the adapter, the block comprising a first surface, a second surface that is perpendicular to the first surface, and a round extending between the first and second surfaces; and a through-opening formed in the block through which the shank of the fastener extends; a second ring extending within the first external annular recess of the fastener so that the block is positioned between the cup and the second ring; a first configuration in which each of the fastener and the pawl is in a first position for permitting relative movement between the grille and the aircraft structure; a second configuration in which each of the fastener and the pawl is in a second position for securing the grille to the aircraft structure; wherein, when the system is placed in the second configuration from the first configuration or vice versa, the round of the block of the pawl overcomes a downwardly-directed reaction or biasing force provided by the horizontal portion of the flat spring; and a tool adapted to drive the fastener, the tool comprising first and second projections adapted to extend within the first and second slots, respectively, the first and second projections being configured to contact, or at least accommodate, the respective multi-plane contours of the first and second slots, wherein a second angle is defined between the first and second projections of the tool, the second angle being equal to the first angle.

A system has been described that includes an assembly adapted to be coupled to a panel for securing the panel to a structure, the assembly comprising a fastener having a longitudinal axis and comprising a tamper-resistant head, the tamper-resistant head comprising a first slot formed therein, the first slot defining a first multi-plane surface contour for interrupting the first slot, and a first depth dimension that is parallel to the longitudinal axis, and varies along a radial direction from the longitudinal axis by increasing as the first depth dimension moves radially outwardly away from the longitudinal axis and decreasing as the first depth dimension moves radially inwardly towards the longitudinal axis. In an exemplary embodiment, the system comprises a pawl coupled to the fastener; a first configuration in which each of the fastener and the pawl is in a first position for permitting relative movement between the panel and the structure; and a second configuration in which each of the fastener and the pawl is in a second position for securing the panel to the structure. In an exemplary embodiment, the tamper-resistant head further comprises a second slot formed therein, the second slot defining a second multi-plane surface contour for interrupting the second slot, and a second depth dimension that is parallel to the longitudinal axis, and varies along a radial direction from the longitudinal axis by increasing as the second depth dimension moves radially outwardly away from the longitudinal axis and decreasing as the second depth dimension moves radially inwardly towards the longitudinal axis. In an exemplary embodiment, each of the first and second multi-plane surface contours comprises a first flat surface that is perpendicular to the longitudinal axis; a second flat surface that is parallel to the longitudinal axis and perpendicular to the first flat surface; and a convex surface extending between the first and second flat surfaces. In an exemplary embodiment, the system comprises a tool adapted to drive the fastener, the tool comprising first and second projections adapted to extend within the first and second slots, respectively, the first and second projections being configured to contact, or at least accommodate, the first and second multi-plane contours, respectively, each of the first and second projections comprising a third flat surface; a fourth flat surface that is perpendicular to the third flat surface; and a first concave surface extending between the third and fourth flat surfaces; wherein a first angle is defined between the first and second slots of the fastener; and wherein a second angle is defined between the first and second projections of the tool, the second angle being equal to the first angle. In an exemplary embodiment, each of the first and second multi-plane surface contours comprises a first flat surface that is perpendicular to the longitudinal axis; and a second flat surface extending angularly from the first flat surface. In an exemplary embodiment, the system comprises a tool adapted to drive the fastener, the tool comprising first and second projections adapted to extend within the first and second slots, respectively, the first and second projections being configured to contact, or at least accommodate, the first and second multi-plane contours, respectively, each of the first and second projections comprising a third flat surface; and an angularly-extending surface extending radially inwardly from the third flat surface; wherein a first angle is defined between the first and second slots of the fastener; and wherein a second angle is defined between the first and second projections of the tool, the second angle being equal to the first angle. In an exemplary embodiment, a first angle is defined between the first and second slots, the first angle being greater than 120 degrees and less than 180 degrees; wherein the tamper-resistant head defines first and second sides spaced in a parallel relation, the second side defining a circumferentially-extending edge or surface; and wherein the tamper-resistant head further comprises a frusto-conical surface extending from the circumferentially-extending edge or surface and tapering to the first side. In an exemplary embodiment, the fastener further comprises a shank extending from the tamper-resistant head and a first external annular recess formed in the distal end portion of the shank; wherein the system further comprises the panel in the form of an aircraft air-return grille to which the assembly is coupled, the aircraft air-return grille defining first and second sides, the second side of the grille defining a surface contour, the grille comprising a first bore extending therethrough; and the structure in the form of aircraft structure, the aircraft structure comprising an opening adapted to be covered by the grille; wherein the assembly further comprises a cup extending through the first bore of the grille, the cup comprising a counterbore through which the shank of the fastener extends, the counterbore defining an enlarged-diameter region, an external annular lip contacting the first side of the grille, and a second external annular recess; a helical spring disposed in the enlarged-diameter region of the cup; an adapter comprising a first wall contacting and accommodating the surface contour defined by the second side of the grille, and a second bore through which the cup extends, the second bore being formed through the first wall, second and third walls spaced in a parallel relation and extending from the first wall, and a region at least partially defined by the first, second and third walls; a first ring extending within the second external annular recess of the cup so that the grille and the first wall of the adapter are disposed between the external annular lip of the cup and the first ring; a flat spring coupled to the adapter, the flat spring comprising a horizontally-extending portion extending between the third and fourth walls of the adapter; a pawl comprising a block at least partially disposed in the region of the adapter, the block comprising a first surface, a second surface that is perpendicular to the first surface, and a round extending between the first and second surfaces; and a through-opening formed in the block through which the shank of the fastener extends; and a second ring extending within the first external annular recess of the fastener so that the block is positioned between the cup and the second ring; and wherein the system further comprises a first configuration in which each of the fastener and the pawl is in a first position for permitting relative movement between the panel and the structure; and a second configuration in which each of the fastener and the pawl is in a second position for securing the panel to the structure; wherein, when the system is placed in the second configuration from the first configuration or vice versa, the round of the block of the pawl overcomes a downwardly-directed reaction or biasing force provided by the horizontal portion of the flat spring.

A system has been described that includes an assembly adapted to be coupled to a panel for securing the panel to a structure, the panel comprising first and second openings and third and fourth openings vertically aligned with the first and second openings, respectively, the assembly comprising a plug portion comprising a first block, a first protrusion extending from the first block; first and second projections extending from the first block in a direction perpendicular to the direction of extension of the first protrusion, the first and second projections being adapted to extend into the first and second openings, respectively, of the grille; first and second tabs extending transversely from the distal end portions of the first and second projections, respectively; and a first plate extending at least from the first block in a direction perpendicular to the direction of extension of the first protrusion and perpendicular to the direction of extension of the first and second projections; a receptacle portion adapted to be coupled to the plug portion to thereby couple the assembly to the panel, the receptacle portion comprising a second block; a first cavity formed in the second block; third and fourth projections extending from the block and adapted to extend into the third and fourth openings, respectively, of the grille; third and fourth tabs extending transversely from the distal end portions of the third and fourth projections, respectively; and a second plate extending at least from the second block. In an exemplary embodiment, the system comprises the panel, the panel comprising a vertically-extending portion disposed between the first and third openings, and between the second and fourth openings; and a fastener comprising a tamper-resistant head and a shank extending therefrom, the shank comprising an external threaded connection; wherein the plug portion further comprises a counterbore extending through the first block; wherein the receptacle portion further comprises a surface defined by the first cavity and a bore formed in the surface, the bore having an internal threaded connection; wherein the system further comprises a first configuration in which the first protrusion is not received within the cavity; and a second configuration in which the first and second projections extend into the first and second openings, respectively; the third and fourth projections extend into the third and fourth openings, respectively; the first protrusion is received within the first cavity; the counterbore is axially aligned with the bore; the fastener extends through the counterbore and into the bore; the internal threaded connection is threadably engaged with the external threaded connection to thereby couple the plug and receptacle portions together; and at least respective portions of the first, second, third and fourth tabs extend over the vertically-extending portion to thereby couple the assembly to the panel. In an exemplary embodiment, the system comprises the panel, the panel comprising a vertically-extending portion disposed between the first and third openings, and between the second and fourth openings; and wherein the plug portion further comprises a barbed projection extending from the first protrusion; wherein the receptacle portion further comprises a surface defined by the first cavity and a bore formed in the surface; wherein the system further comprises a first configuration in which the first protrusion is not received within the first cavity; and a second configuration in which the first and second projections extend into the first and second openings, respectively; the third and fourth projections extend into the third and fourth openings, respectively; the first protrusion is received within the first cavity; the barbed projection extends into and is locked within the bore to thereby couple the plug and receptacle portions together; and at least respective portions of the first, second, third and fourth tabs extend over the vertically-extending portion to thereby couple the assembly to the panel. In an exemplary embodiment, the system comprises the panel, the panel comprising a vertically-extending portion disposed between the first and third openings, and between the second and fourth openings; wherein the plug portion further comprises a counterbore extending through the first block; wherein the receptacle portion further comprises a first surface defined by the first cavity and a first bore formed in the first surface, the first bore having an internal threaded connection; wherein the system further comprises an extension portion adapted to couple the plug and receptacle portions together, the extension portion comprising a third block; a second protrusion extending from the third block; a second cavity formed in third block; a second surface defined by the second cavity; a second bore formed in the second surface and having an internal threaded connection; a barbed projection extending from the second protrusion; a fastener comprising a tamper-resistant head and a shank extending therefrom, the shank comprising an external threaded connection; and a configuration in which the first and second projections extend into the first and second openings, respectively; the third and fourth projections extend into the third and fourth openings, respectively; the first protrusion is received within the second cavity of the extension portion; the counterbore is axially aligned with the second bore of the extension portion; the fastener extends through the counterbore and into the second bore of the extension portion; the internal threaded connection is threadably engaged with the external threaded connection to thereby couple the plug and extension portions together; the second protrusion of the extension portion is received within the first cavity of the receptacle portion; the barbed projection of the extension portion extends into and is locked within the first bore of the receptacle portion to thereby couple the extension and receptacle portions together; and at least respective portions of the first and second tabs extend over the vertically-extending portion of the panel, and at least respective portions of the third and fourth tabs extend over another vertically-extending portion of the panel spaced in a parallel relation to the first-mentioned vertically-extending portion, to thereby couple the assembly to the panel.

A method has been described that includes providing an aircraft air-return grille and aircraft structure, the aircraft structure comprising an opening formed therein; covering the opening of the aircraft structure with the grille; and securing the grille to the aircraft structure after covering the opening with the grille, comprising providing an assembly, comprising providing a pawl and a fastener comprising a tamper-resistant head comprising one or more slots formed therein; and interrupting the one or more slots formed in the tamper-resistant head; coupling the assembly to the grille; driving the tamper-resistant head of the fastener to thereby rotate the fastener; and rotating the pawl in response to driving the tamper-resistant head of the fastener. In an exemplary embodiment, the method comprises preventing vertical movement of the grille, relative to the aircraft structure, after rotating the pawl; wherein the grille defines first and second sides, the second side defining a surface contour; and wherein coupling the assembly to the grille comprises providing an adapter comprising a wall configured to contact and accommodate the surface contour of the second side of the grille; coupling the adapter to the grille so that the wall of the adapter contacts and accommodates the surface contour of the second side of the grille; and coupling the fastener and the pawl to the adapter. In an exemplary embodiment, the method comprises preventing the pawl from rotating freely before, during and after rotating the pawl in response to driving the tamper-resistant head of the fastener, comprising coupling a flat spring to the adapter, the flat spring comprising a horizontally-extending portion; providing a downwardly-directed reaction or biasing force against the pawl using the horizontally-extending portion of the flat spring; and overcoming the downwardly-directed reaction or biasing force provided by the horizontally-extending portion of the flat spring; and limiting any vibration between the air grille and the aircraft structure after securing the grille to the aircraft structure.

A system has been described that includes means for providing an aircraft air-return grille and aircraft structure, the aircraft structure comprising an opening formed therein; means for covering the opening of the aircraft structure with the grille; and means for securing the grille to the aircraft structure after covering the opening with the grille, comprising means for providing an assembly, comprising means for providing a pawl and a fastener comprising a tamper-resistant head comprising one or more slots formed therein; and means for interrupting the one or more slots formed in the tamper-resistant head; means for coupling the assembly to the grille; means for driving the tamper-resistant head of the fastener to thereby rotate the fastener; and means for rotating the pawl in response to driving the tamper-resistant head of the fastener. In an exemplary embodiment, the system comprises means for preventing vertical movement of the grille, relative to the aircraft structure, after rotating the pawl; wherein the grille defines first and second sides, the second side defining a surface contour; and wherein means for coupling the assembly to the grille comprises means for providing an adapter comprising a wall configured to contact and accommodate the surface contour of the second side of the grille; means for coupling the adapter to the grille so that the wall of the adapter contacts and accommodates the surface contour of the second side of the grille; and means for coupling the fastener and the pawl to the adapter. In an exemplary embodiment, the system comprises means for preventing the pawl from rotating freely before, during and after rotating the pawl in response to driving the tamper-resistant head of the fastener, comprising means for coupling a flat spring to the adapter, the flat spring comprising a horizontally-extending portion; means for providing a downwardly-directed reaction or biasing force against the pawl using the horizontally-extending portion of the flat spring; and means for overcoming the downwardly-directed reaction or biasing force provided by the horizontally-extending portion of the flat spring; and means for limiting any vibration between the air grille and the aircraft structure after securing the grille to the aircraft structure.

It is understood that variations may be made in the foregoing without departing from the scope of the disclosure. For example, instead of, or in addition to air-grille-related applications, one or more of the above-described systems, devices and/or methods, and/or any combination thereof, may be employed in other applications, operations, and/or environments, such as, for example, any environment utilizing one or more access panels and/or enclosures. In several exemplary embodiments, instead of, or in addition the air grille 12, one or more of the assemblies 18, 20, 50, 58 and 64 are used to secure one or more other types of panels, such as, for example, access panels, hatches, and/or any combination thereof. In several exemplary embodiments, instead of, or in addition to the aircraft structure 16, one or more of the assemblies 18, 20, 50, 58 and 64 are used to secure one or more panels to one or more other types of structures, such as, for example, enclosure structures, cabinet structures, automotive structures, building structures, consumer-electronic structures, and/or any combination thereof. In several exemplary embodiments, instead of, or in addition to the pawl 32 and/or one or more of the other components described above, one or more of the fasteners 22, 44, 56 and 65 are used to drive other types of mechanisms, which mechanisms, in several exemplary embodiments, are part of larger assemblies. In several exemplary embodiments, instead of, or in addition to the respective shanks 22b, 44b, 56b and 65b, one or more of the fasteners 22, 44, 56 and 65 include other shank designs, including shank designs having non-common, non-standard thread types, and/or common, standard thread types.

In several exemplary embodiments, the elements and teachings of the various illustrative exemplary embodiments may be combined in whole or in part in some or all of the illustrative exemplary embodiments. In addition, one or more of the elements and teachings of the various illustrative exemplary embodiments may be omitted, at least in part, and/or combined, at least in part, with one or more of the other elements and teachings of the various illustrative embodiments.

Any spatial references such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes and/or procedures may be merged into one or more steps, processes and/or procedures.

In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several exemplary embodiments have been described in detail above, the embodiments described are exemplary only and are not limiting, and those skilled in the art will readily appreciate that many other modifications, changes and/or substitutions are possible in the exemplary embodiments without materially departing from the novel teachings and advantages of the present disclosure. Accordingly, all such modifications, changes and/or substitutions are intended to be included within the scope of this disclosure as defined in the following claims. In the claims, means-plus-function clauses are intended to cover the structures described herein as performing the recited function and not only structural equivalents, but also equivalent structures.

What is claimed is:

1. A system comprising:
   an aircraft air-return grille, the grille defining first and second sides, the second side of the grille defining a surface contour, the grille comprising a first bore extending therethrough;
   an aircraft structure, the aircraft structure comprising an opening adapted to be covered by the grille;
   an assembly coupled to the grille for securing the grille to the aircraft structure, the assembly comprising:
      a fastener having a longitudinal axis and comprising:
         a tamper-resistant head, the tamper-resistant head defining first and second sides spaced in a parallel relation, the second side of the tamper-resistant head defining a circumferentially-extending edge or surface, the tamper-resistant head comprising:
            first and second slots formed therein, each of the first and second slots defining:
               a multi-plane surface contour for interrupting the respective slot, and
               a depth dimension that is parallel to the longitudinal axis, and varies along a radial direction from the longitudinal axis by increasing as the depth dimension moves radially outwardly away from the longitudinal axis and decreasing as the depth dimension moves radially inwardly towards the longitudinal axis; and
            a frusto-conical surface extending from the circumferentially-extending edge or surface and tapering to the first side;
            wherein a first angle is defined between the first and second slots, the first angle being greater than 120 degrees and less than 180 degrees;
         a shank extending from the tamper-resistant head; and
         a first external annular recess formed in the distal end portion of the shank;
      a cup extending through the first bore of the grille, the cup comprising:
         a counterbore through which the shank of the fastener extends, the counterbore defining an enlarged-diameter region,
         an external annular lip contacting the first side of the grille, and
         a second external annular recess;
      a helical spring disposed in the enlarged-diameter region of the cup;
      an adapter comprising:
         a first wall contacting and accommodating the surface contour defined by the second side of the grille,
         a second bore through which the cup extends, the second bore being formed through the first wall,
         second and third walls spaced in a parallel relation and extending from the first wall, and
         a region at least partially defined by the first, second and third walls;
      a first ring extending within the second external annular recess of the cup so that the grille and the first wall of the adapter are disposed between the external annular lip of the cup and the first ring;
      a flat spring coupled to the adapter, the flat spring comprising a horizontally-extending portion extending between the third and fourth walls of the adapter;
      a pawl comprising:
         a block at least partially disposed in the region of the adapter, the block comprising:
            a first surface,
            a second surface that is perpendicular to the first surface, and
            a round extending between the first and second surfaces; and
         a through-opening formed in the block through which the shank of the fastener extends;
      a second ring extending within the first external annular recess of the fastener so that the block is positioned between the cup and the second ring;
      a first configuration in which each of the fastener and the pawl is in a first position for permitting relative movement between the grille and the aircraft structure;
      a second configuration in which each of the fastener and the pawl is in a second position for securing the grille to the aircraft structure;
      wherein, when the system is placed in the second configuration from the first configuration or vice versa, the round of the block of the pawl overcomes a downwardly-directed reaction or biasing force provided by the horizontal portion of the flat spring; and
   a tool adapted to drive the fastener, the tool comprising first and second projections adapted to extend within the first and second slots, respectively, the first and second projections being configured to contact, or at least accommodate, the respective multi-plane contours of the first and second slots, wherein a second angle is defined between the first and second projections of the tool, the second angle being equal to the first angle.

2. A system comprising:
   an assembly adapted to be coupled to a panel for securing the panel to a structure, the assembly comprising:
      a fastener having a longitudinal axis and comprising a tamper-resistant head, the tamper-resistant head comprising a first slot formed therein, the first slot defining:

a first multi-plane surface contour for interrupting the first slot, and a first depth dimension that:
is parallel to the longitudinal axis, and
varies along a radial direction from the longitudinal axis by increasing as the first depth dimension moves radially outwardly away from the longitudinal axis and decreasing as the first depth dimension moves radially inwardly towards the longitudinal axis wherein the fastener further comprises a shank extending from the tamper-resistant head and a first external annular recess formed in the distal end portion of the shank; wherein the system further comprises: the panel in the form of an aircraft air-return grille to which the assembly is coupled, the aircraft air-return grille defining first and second sides, the second side of the grille defining a surface contour, the grille comprising a first bore extending therethrough; and the structure in the form of aircraft structure, the aircraft structure comprising an opening adapted to be covered by the grille; wherein the assembly further comprises: a cup extending through the first bore of the grille, the cup comprising: a counterbore through which the shank of the fastener extends, the counterbore defining an enlarged-diameter region, an external annular lip contacting the first side of the grille, and a second external annular recess; a helical spring disposed in the enlarged-diameter region of the cup; an adapter comprising: a first wall contacting and accommodating the surface contour defined by the second side of the grille, and a second bore through which the cup extends, the second bore being formed through the first wall, second and third walls spaced in a parallel relation and extending from the first wall, and a region at least partially defined by the first, second and third walls; a first ring extending within the second external annular recess of the cup so that the grille and the first wall of the adapter are disposed between the external annular lip of the cup and the first ring; a flat spring coupled to the adapter, the flat spring comprising a horizontally-extending portion extending between the third and fourth walls of the adapter;

a pawl comprising: a block at least partially disposed in the region of the adapter, the block comprising: a first surface, a second surface that is perpendicular to the first surface, and a round extending between the first and second surfaces; and a through-opening formed in the block through which the shank of the fastener extends; and a second ring extending within the first external annular recess of the fastener so that the block is positioned between the cup and the second ring; and wherein the system further comprises: a first configuration in which each of the fastener and the pawl is in a first position for permitting relative movement between the panel and the structure; and a second configuration in which each of the fastener and the pawl is in a second position for securing the panel to the structure; wherein, when the system is placed in the second configuration from the first configuration or vice versa, the round of the block of the pawl overcomes a downwardly-directed reaction or biasing force provided by the horizontal portion of the flat spring.

3. The system of claim 2 wherein the tamper-resistant head further comprises a second slot formed therein, the second slot defining:
a second multi-plane surface contour for interrupting the second slot, and
a second depth dimension that:
is parallel to the longitudinal axis, and
varies along a radial direction from the longitudinal axis by increasing as the second depth dimension moves radially outwardly away from the longitudinal axis and decreasing as the second depth dimension moves radially inwardly towards the longitudinal axis.

4. The system of claim 3 wherein each of the first and second multi-plane surface contours comprises:
a first flat surface that is perpendicular to the longitudinal axis;
a second flat surface that is parallel to the longitudinal axis and perpendicular to the first flat surface; and
a convex surface extending between the first and second flat surfaces.

5. The system of claim 4 further comprising a tool adapted to drive the fastener, the tool comprising:
first and second projections adapted to extend within the first and second slots, respectively, the first and second projections being configured to contact, or at least accommodate, the first and second multi-plane contours, respectively, each of the first and second projections comprising:
a third flat surface;
a fourth flat surface that is perpendicular to the third flat surface; and
a first concave surface extending between the third and fourth flat surfaces;
wherein a first angle is defined between the first and second slots of the fastener; and
wherein a second angle is defined between the first and second projections of the tool, the second angle being equal to the first angle.

6. The system of claim 3 wherein each of the first and second multi-plane surface contours comprises:
a first flat surface that is perpendicular to the longitudinal axis; and
a second flat surface extending angularly from the first flat surface.

7. The system of claim 6 further comprising a tool adapted to drive the fastener, the tool comprising:
first and second projections adapted to extend within the first and second slots, respectively, the first and second projections being configured to contact, or at least accommodate, the first and second multi-plane contours, respectively, each of the first and second projections comprising:
a third flat surface; and
an angularly-extending surface extending radially inwardly from the third flat surface;
wherein a first angle is defined between the first and second slots of the fastener; and
wherein a second angle is defined between the first and second projections of the tool, the second angle being equal to the first angle.

8. The system of claim 3 wherein a first angle is defined between the first and second slots, the first angle being greater than 120 degrees and less than 180 degrees;
wherein the tamper-resistant head defines first and second sides spaced in a parallel relation, the second side defining a circumferentially-extending edge or surface; and wherein the tamper-resistant head further comprises a frusto-conical surface extending from the circumferentially-extending edge or surface and tapering to the first side.

9. A method comprising:
providing an aircraft air-return grille and aircraft structure, the aircraft structure comprising an opening formed therein;
covering the opening of the aircraft structure with the grille; and
securing the grille to the aircraft structure after covering the opening with the grille, comprising:
  providing an assembly, comprising:
    providing a pawl and a fastener comprising a tamper-resistant head comprising one or more slots formed therein; and
    interrupting the one or more slots formed in the tamper-resistant head;
  coupling the assembly to the grille;
  driving the tamper-resistant head of the fastener to thereby rotate the fastener; and
  rotating the pawl in response to driving the tamper-resistant head of the fastener further comprising: preventing vertical movement of the grille, relative to the aircraft structure, after rotating the pawl; wherein the grille defines first and second sides, the second side defining a surface contour; and wherein coupling the assembly to the grille comprises: providing an adapter comprising a wall configured to contact and accommodate the surface contour of the second side of the grille; coupling the adapter to the grille so that the wall of the adapter contacts and accommodates the surface contour of the second side of the grille; and coupling the fastener and the pawl to the adapter; preventing the pawl from rotating freely before, during and after rotating the pawl in response to driving the tamper-resistant head of the fastener, comprising: coupling a flat spring to the adapter, the flat spring comprising a horizontally-extending portion; providing a downwardly-directed reaction or biasing force against the pawl using the horizontally-extending portion of the flat spring; and overcoming the downwardly-directed reaction or biasing force provided by the horizontally-extending portion of the flat spring; and limiting any vibration between the air grille and the aircraft structure after securing the grille to the aircraft structure.

\* \* \* \* \*